(12) United States Patent
Samid

(10) Patent No.: US 11,062,187 B1
(45) Date of Patent: Jul. 13, 2021

(54) SHAPELESS—A NEW LANGUAGE CONCEPT AND RELATED TECHNOLOGY

(71) Applicant: Gideon Samid, Rockville, MD (US)

(72) Inventor: Gideon Samid, Rockville, MD (US)

( * ) Notice: Subject to any disclaimer, the term of this patent is extended or adjusted under 35 U.S.C. 154(b) by 0 days.

(21) Appl. No.: 16/997,819

(22) Filed: Aug. 19, 2020

Related U.S. Application Data

(60) Provisional application No. 63/051,652, filed on Jul. 14, 2020, provisional application No. 63/034,401, filed on Jun. 4, 2020, provisional application No. 63/005,062, filed on Apr. 3, 2020, provisional application No. 62/963,855, filed on Jan. 21, 2020, provisional application No. 62/931,807, filed on Nov. 7, 2019, provisional application No. 62/926,560, filed on Oct. 27, 2019, provisional application No. 62/900,567, filed on Sep. 15, 2019.

(51) Int. Cl.
| | |
|---|---|
| *G06K 19/06* | (2006.01) |
| *H04N 9/31* | (2006.01) |
| *B01F 5/00* | (2006.01) |
| *G06K 7/14* | (2006.01) |

(52) U.S. Cl.
CPC ...... *G06K 19/06037* (2013.01); *B01F 5/0077* (2013.01); *G06K 7/1417* (2013.01); *G06K 19/06046* (2013.01); *H04N 9/3102* (2013.01)

(58) Field of Classification Search
CPC .............. B01F 2215/005; B01F 5/0077; B01F 5/0603; B01F 5/0608; B01F 5/0665; B01F 5/0682; B01F 5/0688; B01F 5/069; B01F 7/0075; B01F 7/00908; G06K 19/06037; G06K 19/06046
See application file for complete search history.

(56) References Cited

U.S. PATENT DOCUMENTS

| | | | | |
|---|---|---|---|---|
| 6,458,547 | B1 * | 10/2002 | Bryan ................... | G01N 21/253 356/215 |
| 6,812,873 | B1 * | 11/2004 | Siohan .................... | H03M 7/40 341/107 |
| 8,795,960 | B2 * | 8/2014 | Seul ...................... | C12Q 1/6809 435/6.1 |
| 2003/0083485 | A1 * | 5/2003 | Milos .................... | C12N 9/0077 536/23.2 |
| 2006/0187251 | A1 * | 8/2006 | Pulver .................. | B41J 2/04563 347/13 |
| 2006/0274112 | A1 * | 12/2006 | Jackson Pulver ...... | B41J 2/0451 347/42 |
| 2007/0019016 | A1 * | 1/2007 | Silverbrook .......... | G06K 15/102 347/13 |
| 2007/0258329 | A1 * | 11/2007 | Winey ................... | A63B 53/10 367/140 |

\* cited by examiner

*Primary Examiner* — Thien M Le

(57) ABSTRACT

Shape Dependent alphabets are error prone and quite imposing on their reader. Proposing "Shapeless"—an alphabet based on the entropic state of a mixture—offering easy, redundant reading. Applications include marking packages for shipping and industrial handling, signing items to hinder fraud, offering alternative communication channels, and analyzing video streams for changes of interest.

13 Claims, 15 Drawing Sheets

Entropic Reading Illustration

Fig-1 Entropic Reading Illustration
(a)        (b)        (c)
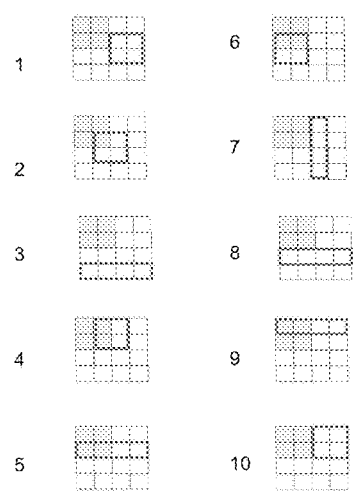
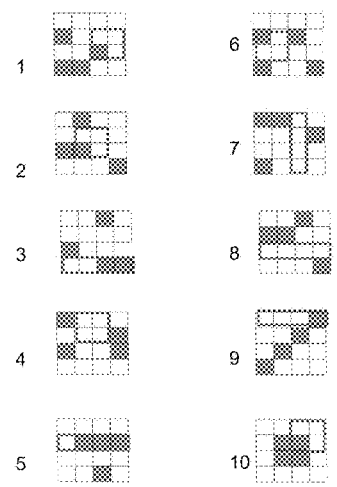
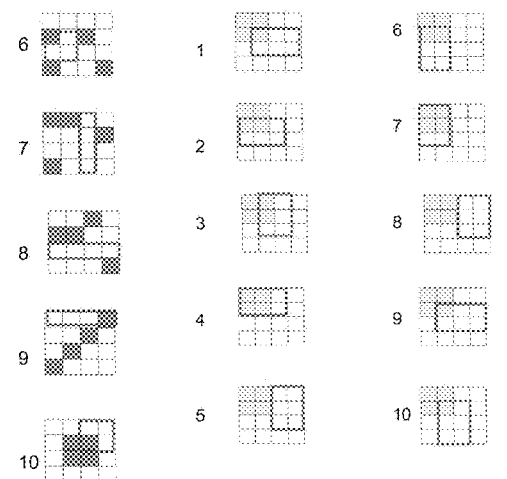
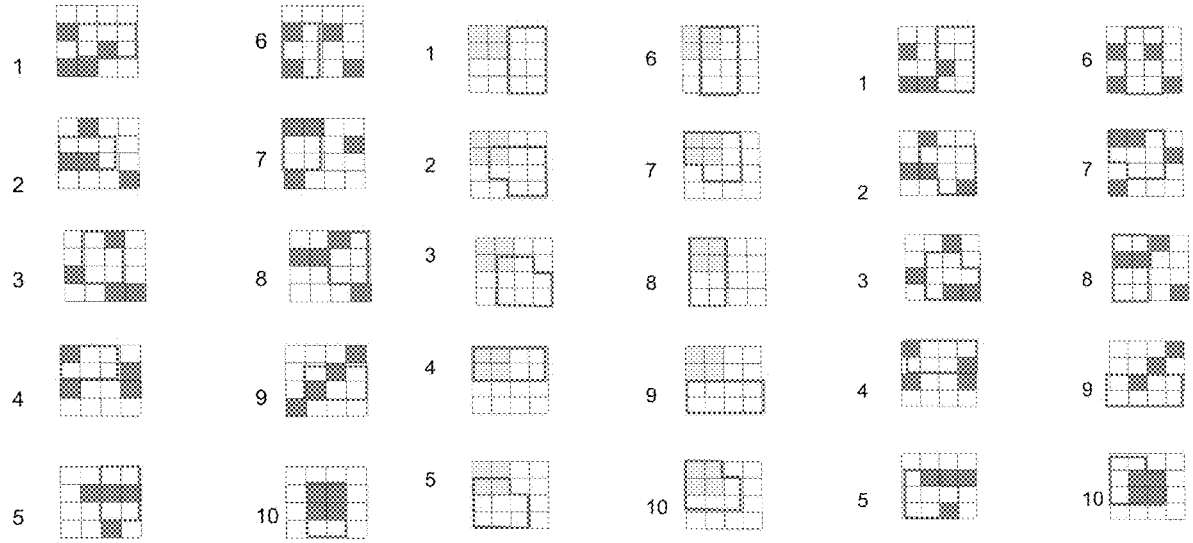
(d)        (e)        (f)

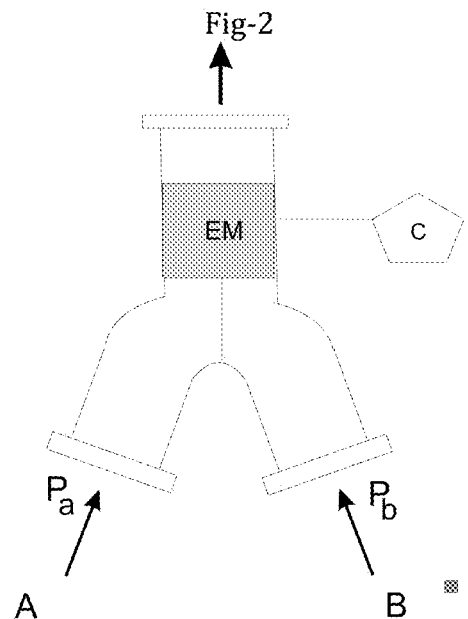
Entropic Mixing Apparatus
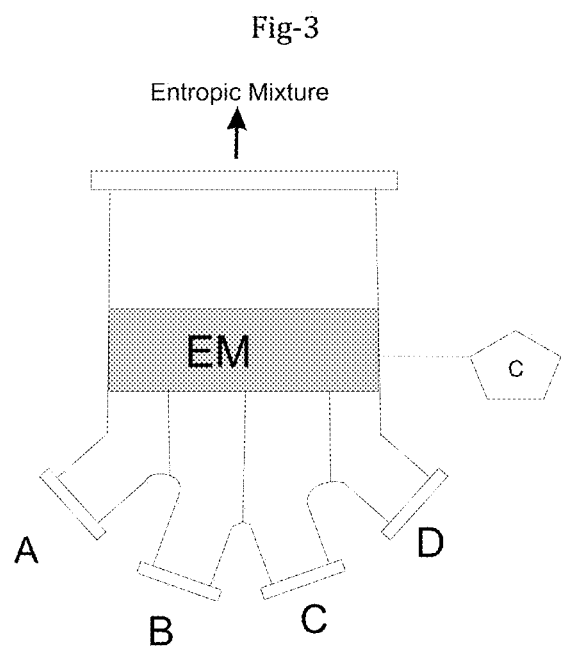
multi ingredient entropic mixture

Cascaded Entropic Mixing Apparatuus

Entropic Mixing Stages

Entropic Ratio Disc Set

Slicing Round of a three ingredients entropic mixing

Entropic Ratio Discs

Entropic Marking with Tracers

Variable Aperture Entropic Disc

Entropic Message in Inherent

Entropic Message Readable
on a tall flag on a windy day

Entropic Reader Monitors Dispensing of Pills

Preventing Friendly Fire with Entropically Marked Uniform

Entropic Writer

Entropically Marked Rolling balls

Fig-17
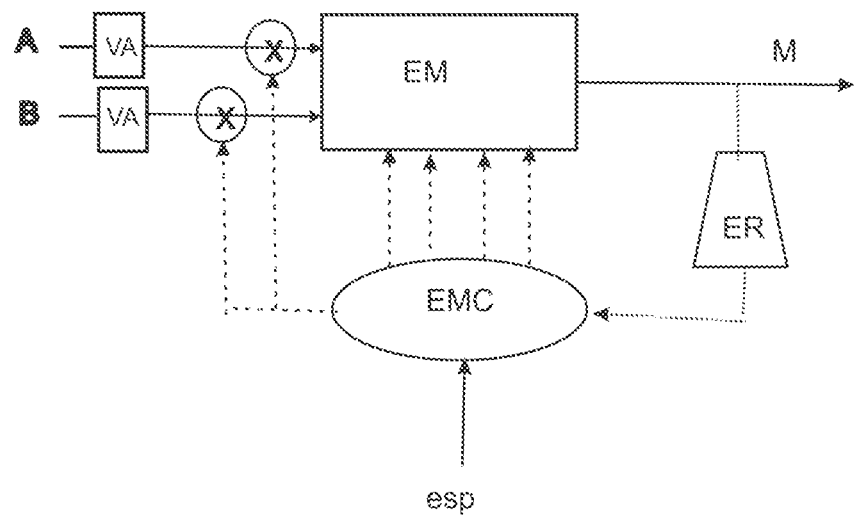
Entropic Mixing Apparatus (EMA)
F-g-18
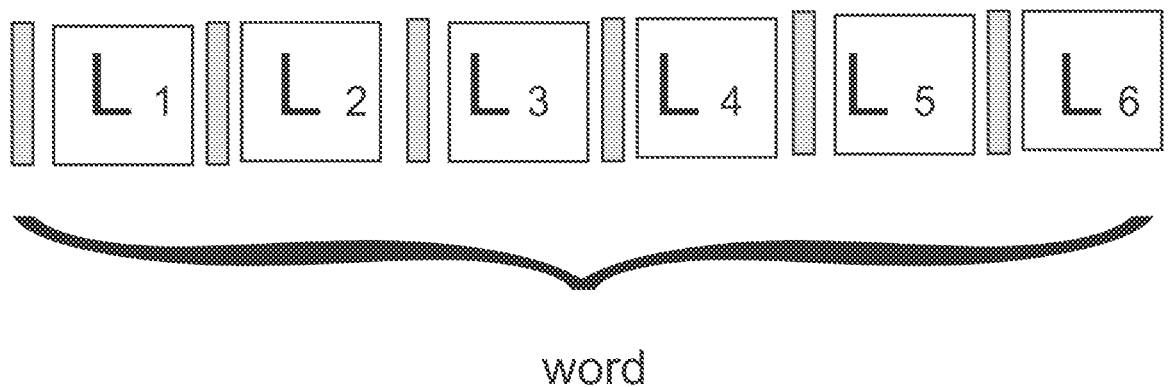
Writing an Entropic Word Live Entropic Traffic Report Entropia CCTV Entropic Air-Traffic Control Significance Orientation Entropic Message Fig-23
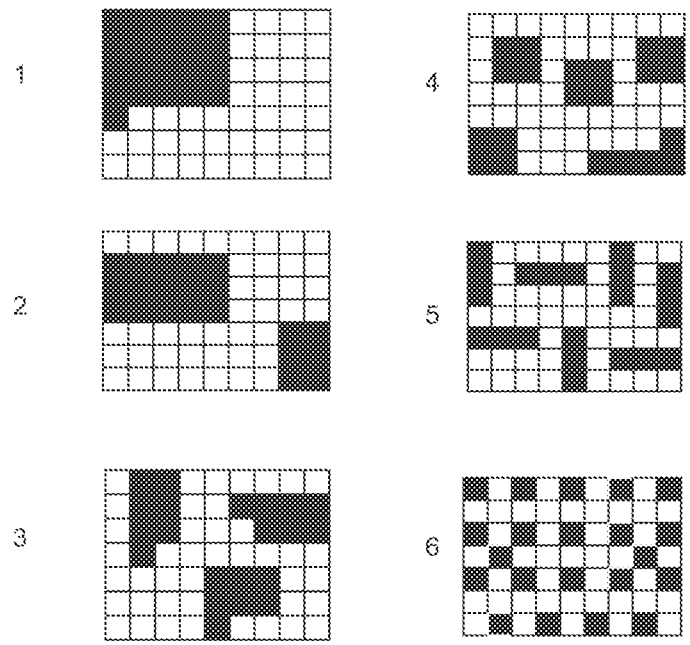
Uniformly Adjusting in Screen Writing
Entropic Mixture of Smooth-Rough Surfaces
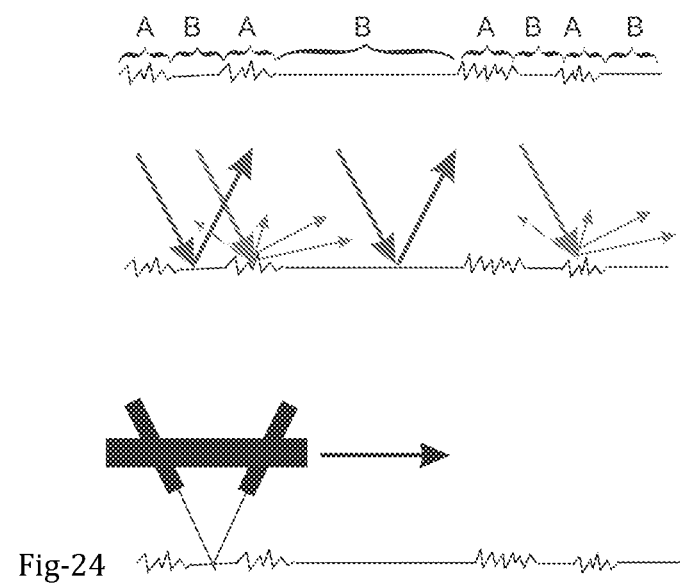
Fig-24

Fig-25
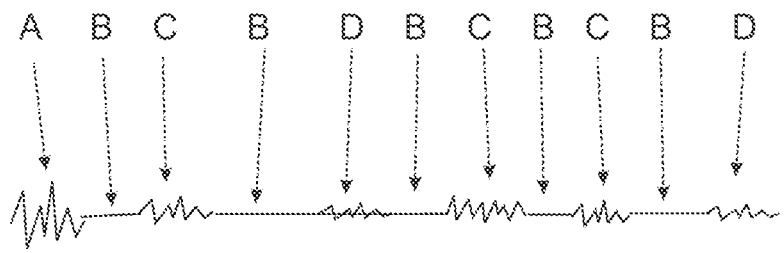
A Four smooth-rough Ingredients entropic mixture
Fig-26
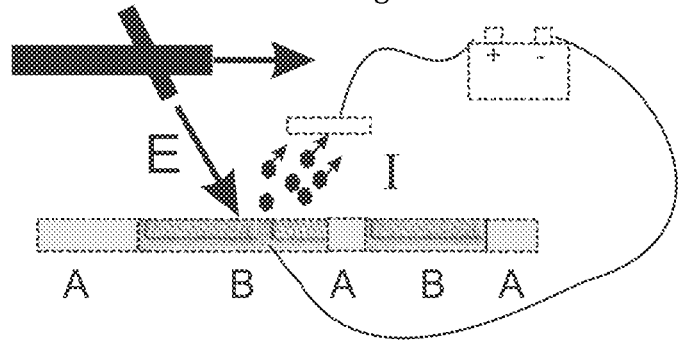
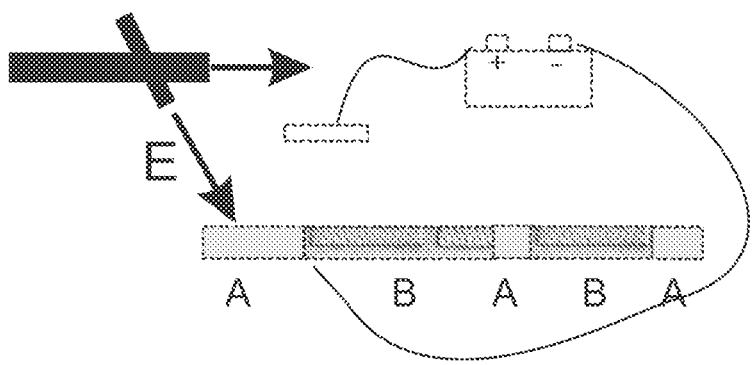
Photoelectric Entropic Reading Fig -27
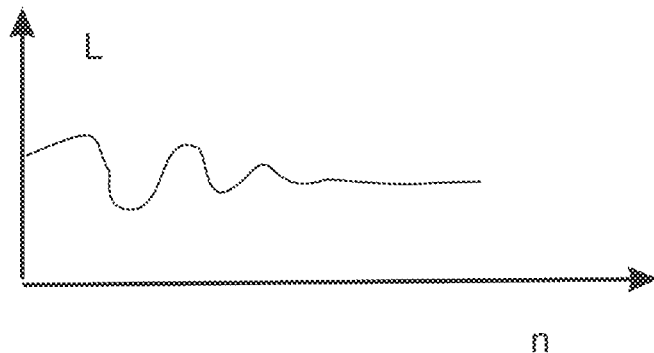
Asymptotic Reading of Entropic Letters
Fig-28
Superimposing Shape and Shapeless Alphabet
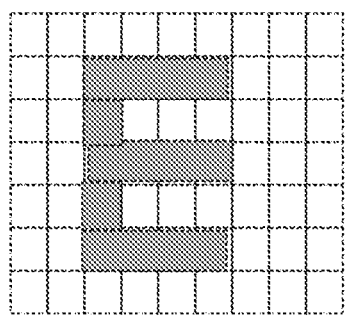
shape
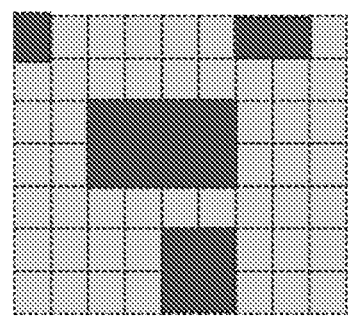
shapeless
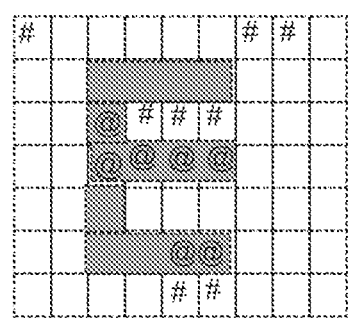
superimposed

SHAPELESS—A NEW LANGUAGE CONCEPT AND RELATED TECHNOLOGY

US PATENT APPLICATION SPECIFICATIONS

Shape Dependent alphabets are error prone and quite imposing on their reader. Proposing Shapeless—an alphabet based on the entropic state of a mixture—offering easy, redundant reading. Applications include marking packages for shipping and industrial handling, signing items to hinder fraud, offering alternative communication channels, and analyzing video streams for changes of interest.

CROSS REFERENCE TO RELATED APPLICATIONS

Provisional Application No. 63/051,652 filed on Jul. 14, 2020; Provisional Application No. 63/034,401 filed on Jun. 4, 2020; Provisional Application No. 63/005,062 filed on Apr. 3, 2020; Provisional Application No. 62/963,855 filed on Jan. 21, 2020; Provisional Application No. 62/931,807 filed on Nov. 7, 2019; Provisional Application No. 62/926,560 filed on Oct. 27, 2019; Provisional Application No. 62/900,567 filed on Sep. 15, 2019."

BACKGROUND OF THE INVENTION

Computer technology opened an array of possibilities for new and useful languages, helping in human interaction and supporting man-machine interface. E.g.: Base64, barcodes, QR, emoji. At the human end all these languages have shape-based letters. To be read right these shapes need to be viewed from a certain direction (to prevent confusion like between "6" and "9"), and the full geometry of the letters must be readable (So that an "E" is not interpreted as an "F"). This background of shape-based alphabet suggests a conceptual departure towards a 'shapeless alphabet' where information is captured not by the specificity of shape, form and geometry, but otherwise, particularly through the degree of entropy expressed in a mixture of two ingredients. The human eye distinguishes between uniform and less uniform mixtures, and a camera will do so very well. Historically, new languages opened doors to important new developments; one may expect a similar outcome here.

BRIEF SUMMARY OF THE INVENTION

Language is traditionally written with shape-based letters, as English, or bar-codes, or even emoji icons. Reading such letters may be easily distorted if a line or two are missing or folded. This invention describes a language written with shapeless entities, namely the letters do not depend on specific shape and form, but rather on quantitative ratio between two mixed ingredients, and the degree of uniformity of their mixture. The "shapeless" letter (also known as the entropic letter) can be accurately read from any direction over a folded or curved surface where some parts are covered, allowing for robust message writing. Applications include packaging, shipping, handling, industrial control, preventing friendly fire, emergency rescue, and various video technology applications. The invention describes shapeless letters generated on computer screens and shapeless letters generated through an invented entropic mixer, mixing two chemicals into a mixture representing an entropic message.

BRIEF EXPLANATION OF DRAWINGS

FIG. 1 Entropic Reading Illustration The figures shows a board constructed from 4×4=16 squares which are marked as either ingredient A (shaded squares) or ingredient B, (unshaded squares). Two entropic modes are shown: (i) the A squares come in chunks of 4 contingent squares, (ii) the A squares come in individual squares. The board is analyzed through 10 randomized slicing. Each slice is analyzed per its A v. B contents, and the results are computed in the section "illustration" in the specifications. Three sizes of slices are used: 4, 6, and 8 squares. In each of the slice sizes, the result show that the entropy (the uniformity) is higher in the case where ingredient A is distributed per individual squares, as expected.

FIG. 2 Entropic Mixing Apparatus This figure shows a basic bilateral apparatus. Two ingredients A and B are pushed from below, each with its own pressure $P_a$ and $P_b$ respectively. The two ingredients are fed into the entropic mixer, EM where they are mixed in a desired state of entropy and pumped on from there. The EM is controlled by an electronic controller, C.

FIG. 3 Multi Ingredient Entropic Mixer This figure shows an entropic mixer taking in 4 ingredients A, B, C, and D. The ingredients are fed into the EM, which arranges them in the desired entropic state. Similarly there may be any number of ingredients entropically mixed.

FIG. 6 Entropic Ratio Disc Set This figure shows flat view of the two discs marked "S" and "R" shown in future 5, only that in this figure the discs are set to admit 6 ingredients to be co-mixed entropically. The figure shows disc S with 6 holes of varying sizes. Each hole will be fed by a supply line of one ingredient. Disc R rotates abreast of disc S. Every time the disk R opening overlaps over a given opening in disc S the ingredient that flows through this hole is admitted to the next entropic chamber. The faster R rotates the less ingredient material is admitted. The larger the hole for the ingredient, the more of the ingredient is admitted. The greater the pressure that the ingredient is under, the more ingredient material is pushed through.

FIG. 17: Entropic Mixing Apparatus (EMA) configuration. This figure shows the configuration of the apparatus, EMA. The two mixed ingredients A and B are fed into the EM—the entropic mixer. The stream is controlled through valves, which in turn are controlled by the entropic mixer controller, EMC. The EMC also controls various operational parameters of the EM, as shown with four dotted lines. The mixture generated in the EM flows out, as shown in the solid arrow marked by "M" (mixture). As it comes out the mixture is examined by an entropic reader that is part of the EM apparatus. The mixture readings are routed back to the EM controller. The logic inside the controller adjusts the controlled parameters to bring the output closer to the desired entropic message it should carry. This desired message is inputted to the EMC through an outside line marked entropic set point (esp). Standard control algorithms are employed in the EMC to adjust the output until it fits the desired set point. The EMA also includes the option to inject divider material to the mix, to signal the boundaries where the mixture carries the desired message, and to indicate boundaries between individual messages (letters) which combine into words. The EMA may be equipped with a heater or a cooler as the case may be, to adjust the viscosities of ingredients A and B to the desired range. Heat generally lower viscosities, and cold temperature increases them. But there are exceptions. These heat exchangers may be fitted on the EM itself or as shown in the figure, be fitted on the intake lines for ingredients A and B. In the figure they are labeled VA— viscosity adjusters.

FIG. 18 Writing an Entropic Word The figure show a stretch of mixture of two ingredients A and B comprised of 6 letters separated by a divider material. The six letters combine to be a single word.

FIG. 23 Uniformity Adjusting in Screen Writing This figure shows a message area M comprised of 7×9=63 pixels. M shows two ingredients A and B depicted as black color for A and white color for B. Six examples are shown. In all of them the ratio $R_m=|A|/|B|=21/42=0.5$. In the first example the uniformity is minimal as all the 21 A pixels are put in one single block. In the second case A is divided to two block, higher uniformity . . . and so on until example 6 where the uniformity is maximized.

FIG. 24: Entropic Mixture of Smooth-Rough Surfaces
The top of the figure shows a surface comprised of smooth and rough areas, marked as A and B. The middle part of the drawing shows the difference between the response of a smooth area of the surface and a rough area thereto. When light (laser or otherwise) is shined on a smooth surface, the light beam is reflected symmetrically, but when the same beam is directed at a rough area, then the light is scattered. The bottom part of the figure shows an entropic reader comprised of a radiating element that sends a light beam to the inspected surface at a prescribed angle, and comprised of a light detector positioned so that it would read the light beam reflected symmetrically from a smooth area of the surface. If light is detected above a certain threshold then the shined spot is determined to be smooth. Otherwise it is regarded as rough. The contraption glides over the surface to take a good measurement of the entropic mixture. Alternatively the surface can be made to roll past the detector apparatus. The apparatus is engineered to cover sufficiently large area of the inspected surface.

FIG. 25 A Four Smooth-Rough Ingredients Entropic Mixture
This figure shows a surface comprised of smooth area and three grades of roughness.

FIG. 26 Photoelectric Entropic Reading The figure shows an electromagnetic radiation E projected onto an inspected surface. The surface is comprised of two material ingredients A and B. A is material with electrons bonded to their nucleolus so tight that the incoming radiation does not release them. Material B, on the other hand, is a material where the electrons are sufficiently loosely bonded to their nucleus, such that when the radiation E 'attackes' them, some electrons get loose. As they become 'free' they are pulled up by a positive electrode (shown). The resultant current is measured and confirms the identity of the surface material. The whole contraption glides across the inspected surface in order to perform an accurate reading of its entropic mixture.

FIG. 27 Asymptotic Reading of Entropic Letters This graph shows the application of the differential method for entropic reading. The entropic reader reads slices in the mixture, M, and applies the procedure to compute the entropic message—the entropic letter—on M. When new slices are added to the measured slices list the computed value changes. The figure shows how the value of the letter L oscillate and changes when a new slice is added to a short list of measured slices, but eventually when the number of slices grows and grows, the value of computed letter L is converging to the asymptotic read of the entropic letter L associated with surface M.

FIG. 28 Superimposing Shape and Shapeless Alphabet
The figure shows first a shape-based message, the letter "E" expressed in pixels on a screen. This is done by using a light background as the "page" and a dark coloring to draw the letter, "E", the "ink". Second it depicts a shapeless message expressed on the same size screen, expressed through dark and light colors. The idea of the superimposition is that the light background in the shape-based screen is marked with two shades of light color: $L_1$, and $L_2$. The human eye intended to read the shape based message will not distinguish between these two shades, but a sensitive camera will. Also the dark color in the shape-based message will be depicted with two shades of dark: $D_1$, and $D_2$. Again, the human eye does not distinguish between the shades but a camera does. In the superimposed part of the figure every light pixel in the shape-based screen will be written as $L_1$ shade, except for background pixels that are marked 'dark' in the shapeless screen. These particular pixels will be marked $L_2$. In the figure $L_2$ pixels are represented as "#". Also, in the superimposed screen, the "ink" will be marked as dark shade $D_1$, except for pixels that correspond to the dark shade on the shapeless screen. The latter will be marked with shade $D_2$. On the figure the $D_2$ pixels are marked with '@'. This arrangement allows a human reader (or a corresponding camera) to read the letter "E" on the screen. All the while, the same, or different camera will distinguish between $L_1$ and $L_2$ shades, and between $D_1$ and $D_2$ shades. The latter camera will then count all the pixels that are marked either $L_1$ or $D_1$ as one shapeless color, and all the pixels that are marked $L_2$ and $D_2$, as the opposite shapeless color. All in all the superimposed screen will convey both a shape-based message and a shapeless message.

INTRODUCTION

Figure 4:
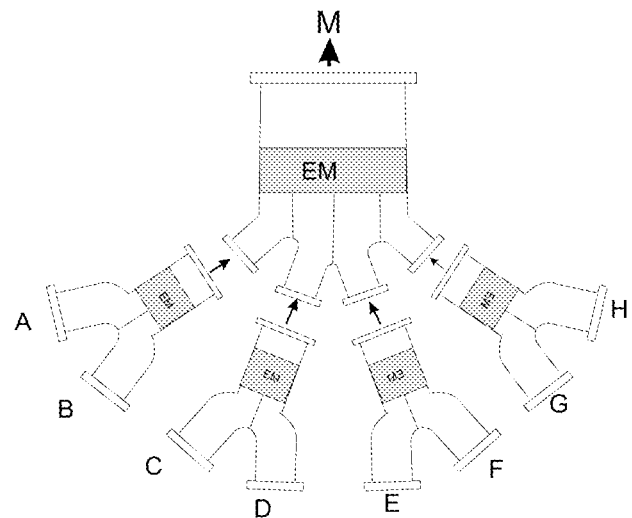
FIG. 4: Cascaded Entropic Mixing Apparatus This figure show a 4 ingredient mixing apparatus fed with the output of four bilateral entropic mixtures, so that all in all 8 ingredients build up the entropic state (A, B, C, D, E, F, G, H). This configuration maintains the bilateral entropic message between the ingredients in the bilateral mixers, namely A v. B, C. v. D. E v. F and G v. H.
Figure 5:
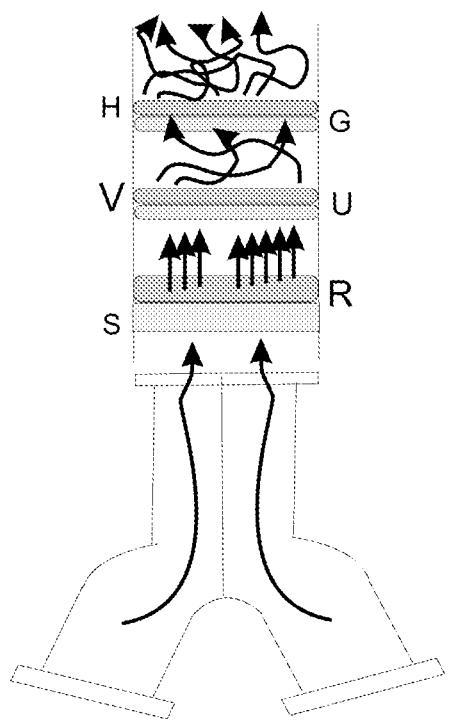
FIG. 5: Entropic Mixing Stages This figure shows how two ingredients are fed into an entropic mixing apparatus. They first encounter a stationary disk "S" fitted with holes of desired size through which the two ingredients flow further as the upper disc, "R" rotates at a desired speed, and every round it 'chops' a chunk of both ingredients, sending them to the next stage—the mixing stage where two discs, "U" and "V" are rotating in counter directions and each at desired speed, so that they create a moving location for the opening through which the mixture is moving to the next stage where again two discs "G" and "H" also rotate in counter directions, similarly create a moving location for the flow emergence forward. Such sets of two rotating discs may be added at will. Eventually the mixture emerges from the contraption with a desired entropic state.
Figure 6:
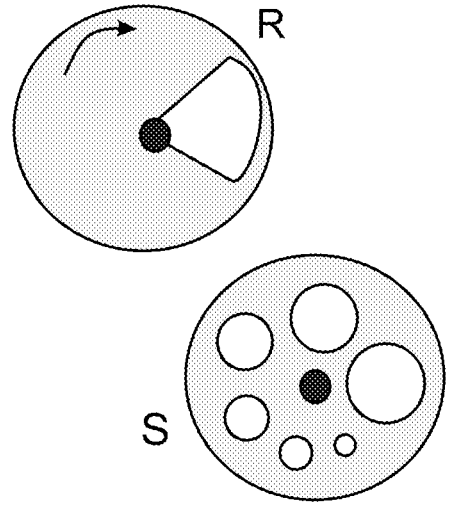
Figure 7:
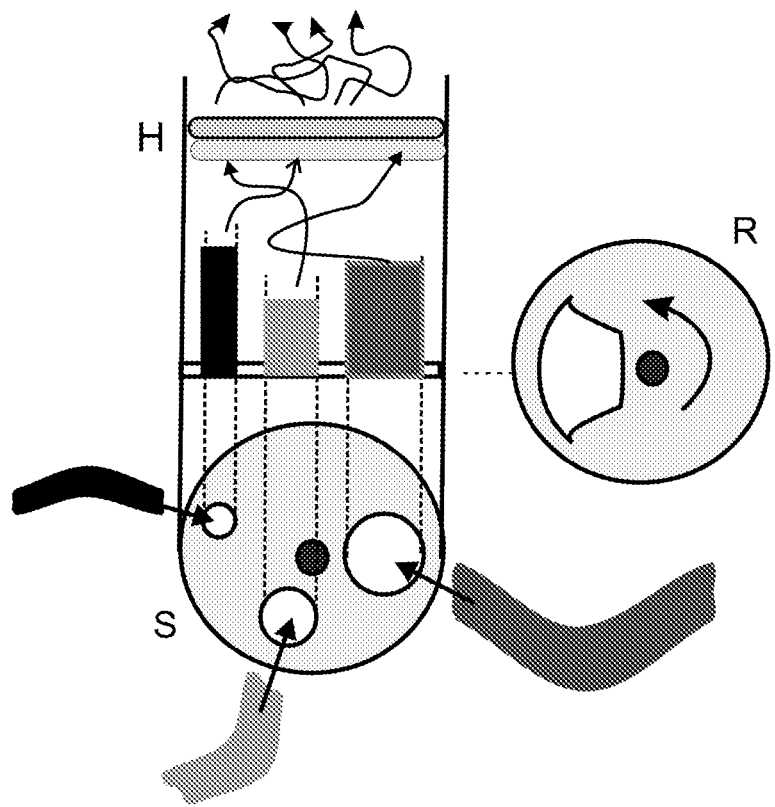
FIG. 7 Slicing Round of a Three Ingredients Entropic Mixing This figure shows a stationary entropic ring with three different size holes. Each hole is shown to be the terminal point of a feeding line of an ingredient destined for entropic mixing. (Shown in blue, pink, and black). The figure shows above the disc a graphics of the column of material of each ingredient that is cooped up in one round of disc R that rotates abreast of disc S. The ingredient with the larger hole, is pumped in in a greater amount. The exact amount pumped for the mixing also depends on the pressure that moves each ingredient and the respective viscosity thereto. Disc R is shown in the Sid. The figure shows how the 'sliced columns' of ingredients are pushed to the mixing set of disc, which like in FIG. 5 is comprised of two moving discs rotating counter each other, creating a moving spot for the flow forward.
Figure 8:
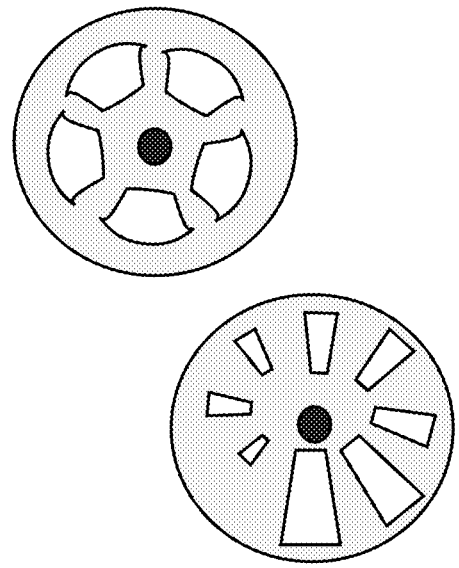
FIG. 8 Entropic Ratio Discs This figure shows two types of stationary discs in an entropic mixture setup. The top one admits up to 5 ingredients, each admitted through the same size opening. The bottom disc is fitted with 8 holes of different aperture size each, admitting up to 8 ingredients to be entropically mixed.
Figure 9:
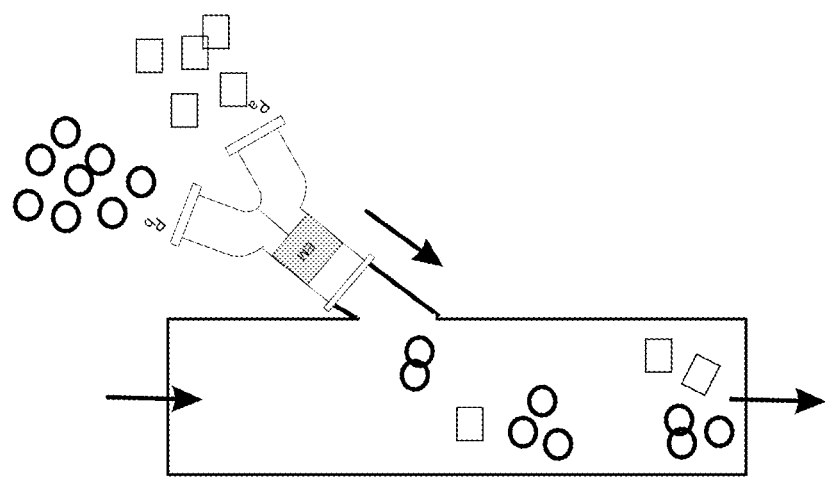
FIG. 9: Entropic Marking with Tracers This figure shows two entropic ingredients symbolized by squares and circles, as they are fed into an entropic mixer which in turn injects the mix into a carrier fluid.
Figure 10:
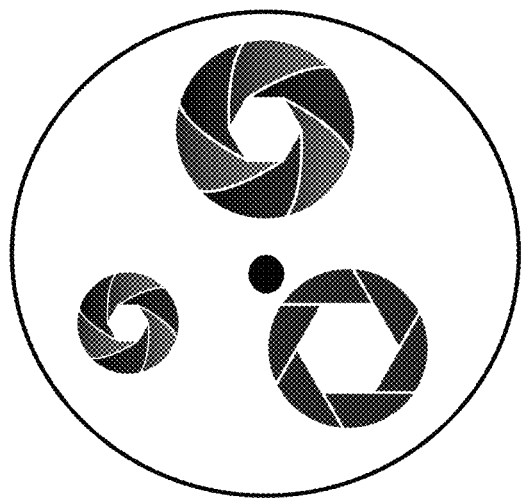
FIG. 10 Variable Aperture ENtropic Disc This figure shows a stationary entropic disc fitted with three inlet holes, where each inlet hole is built as a variable aperture contraption so that the entropic mixer controller can set the size of the hole for each mixing batch.
Figure 11:
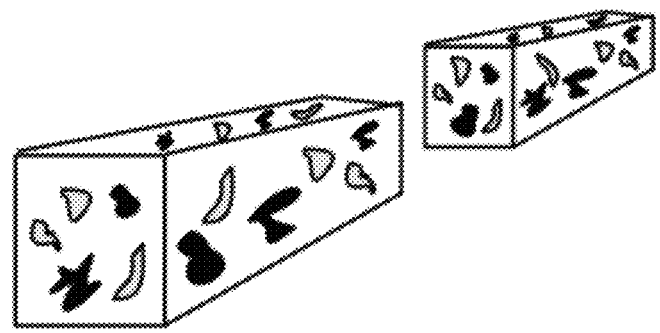
FIG. 11 Entropic Message is Inherent The figure shows a block of matter constructed with an entropic message, which is visible from any direction through any face of the block, and when the block is cut—the message is readable from the faces that were exposed in the cut.
Figure 12:
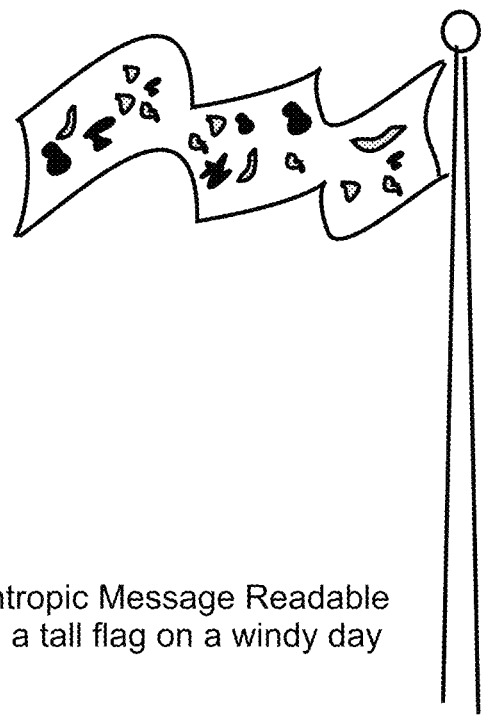
FIG. 12 Entropic Message Readable on a tall flag on a windy day The figure shows a flag flapping in a strong wind. Any shape-wise language on it will be hard to read, but an entropic message is easily readable. Important in cases of emergency.
Figure 13:
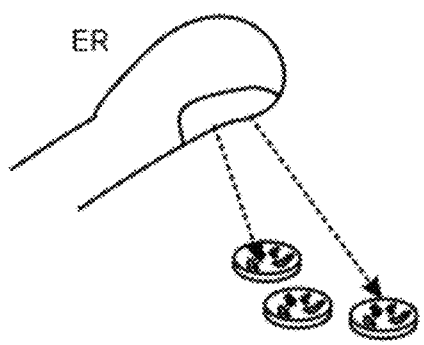
FIG. 13: Entropic Reader Monitors Dispensing of Pills The figure shows a pill dispensing tray with entropically marked pills which are monitored by a fixed entropic reader. The figures shows several sorts of pills entropically marked. Such marking can be used together with shape information to monitor handling of pills.
Figure 14:
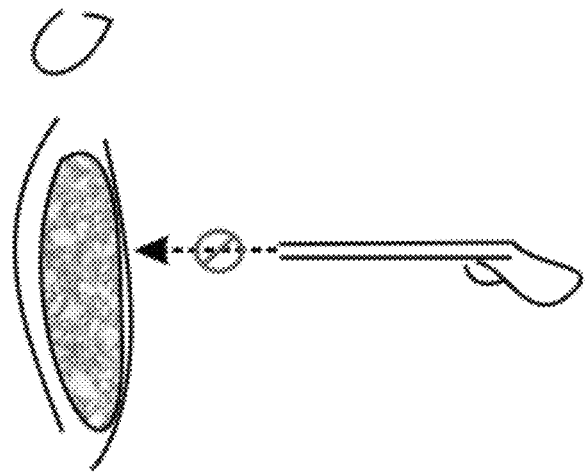
FIG. 14 Preventing Friendly fire with Entropically Marked uniform Friendly fire is a painful unresolved problem in the battlefield. Machinegun and rifles can be fitted with an entropic reader that will identify friendly uniform even is dusty and only partially exposed, and then either not shoot or alert the shooter. It is difficult to achieve this degree of field efficacy with shape based alphabet.
Figure 15:
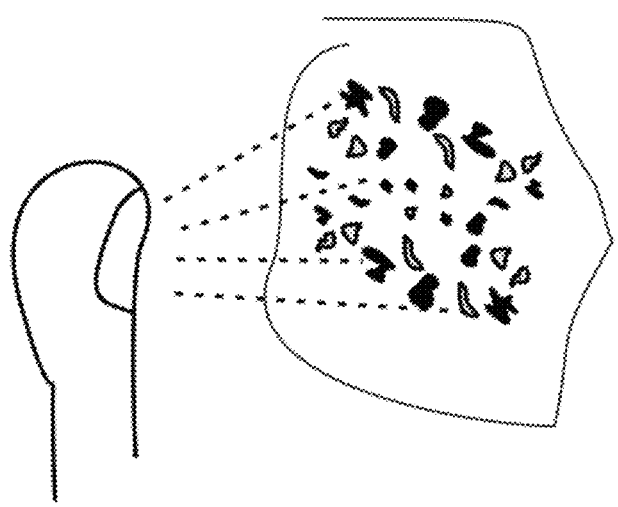
FIG. 15 Entropic Writer This figure depicts a hand-held entropic writer, fed from two containers with the mixed ingredients. It spray-paints an entropic layer on some surface, ready for an entropic reader to read.
Figure 16:
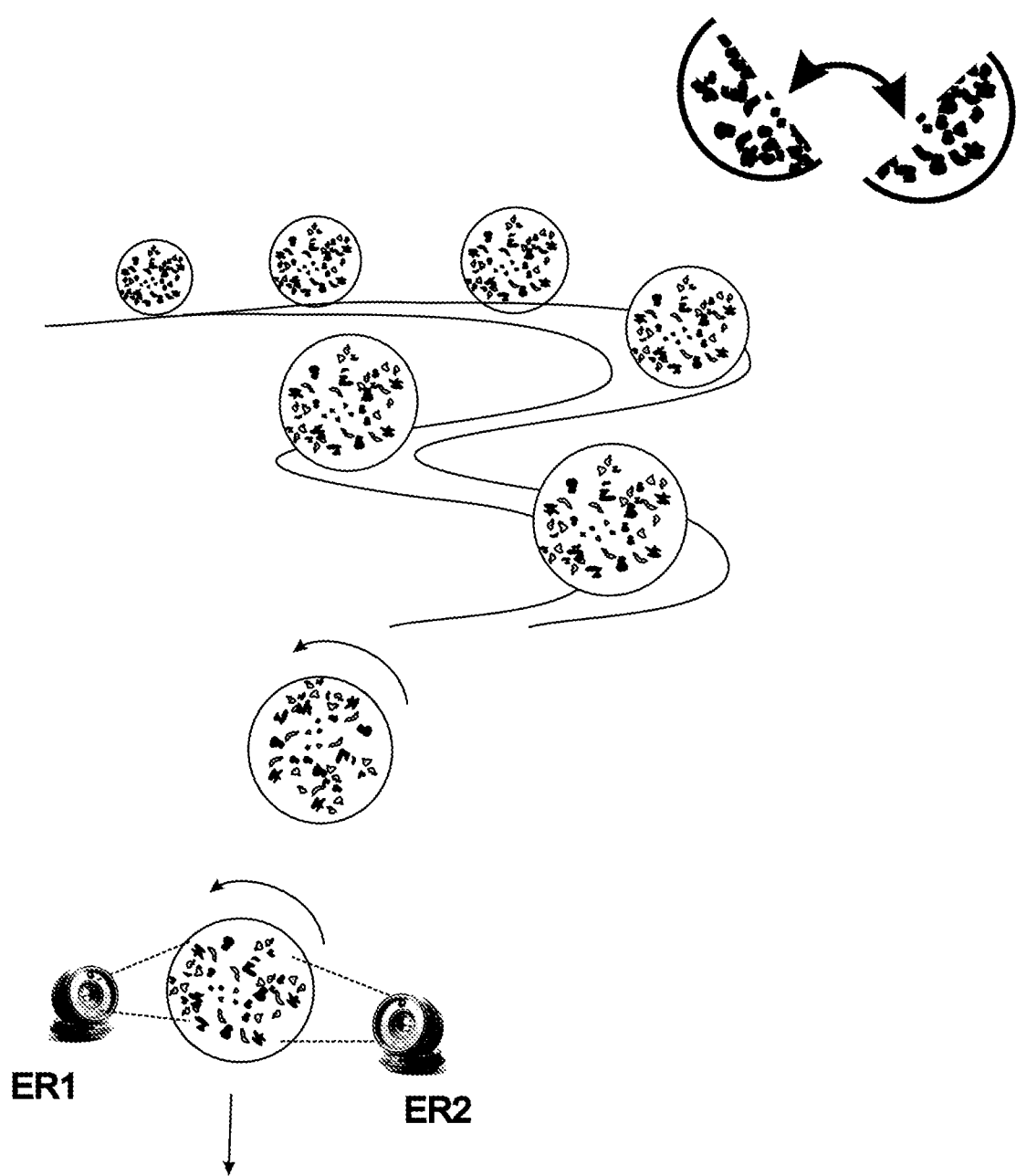
FIG. 16 Entropically Marked Rolling Balls The figure shows rails over which balls are rolling down the slope. When a ball drops from the rail to the next station of its processing, it is viewed by two entropic readers that keep track of which ball came through. The balls can be objects of interests or they may be handling enclosures housing some items of interest. The advantage of balls is that they roll freely on every minor slope and which is easier and cheaper to install than rolling conveyors needed for square boxes. Since the entropic message is readable from every direction, it makes no difference if the ball rotates. By contrast any shape based alphabet require particular orientation between the reader and the examined object.
Figure 19:
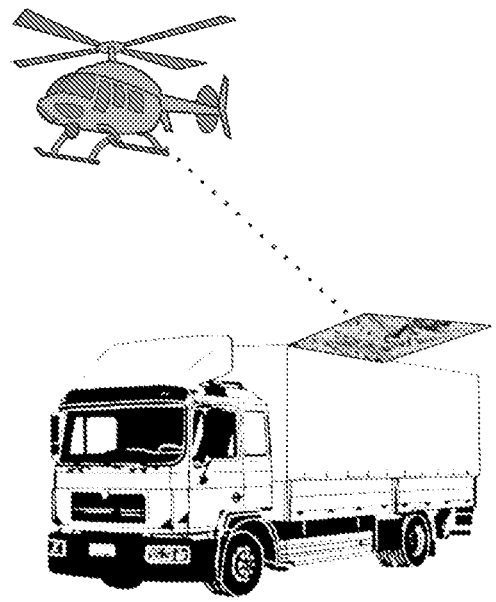
FIG. 19 Live Entropic Traffic Report The figure shows a truck fitted with a large screen on which the truck paints entropic message, which is picked up by over hovering chopper.
Figure 20:
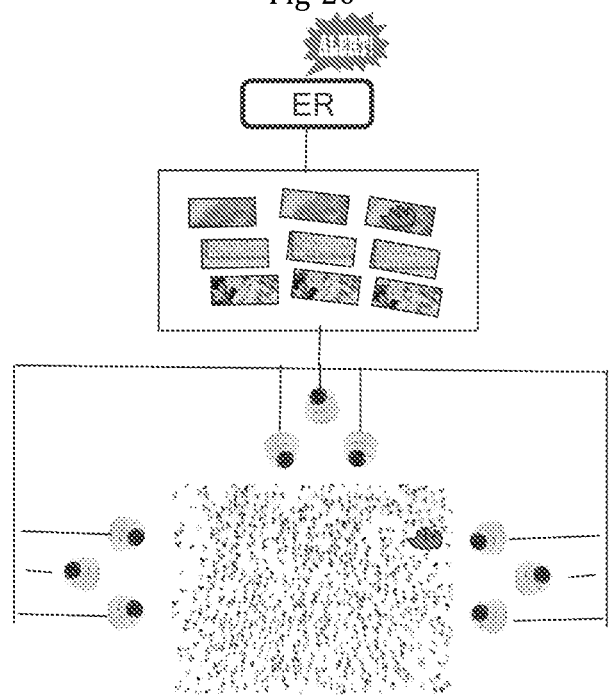
FIG. 20 Entropia CCTV This figure shows a large crowd being monitored by 9 CCTV cameras which feed into 9 screens. The screen are undergoing continuous entropic reading in order to spot unusual occurrence in the CCTV view range. The figure shows a fire erupting in one area of the crowd. The CCTV camera trained on that area projects the fire on its screen (see the red spots). The fire creates a very different entropic reading of the screen, and generates an alarm likely being fed to a human monitor. This is a better exploitation of scarce human attention. Instead of getting bored looking at nine repeating screen, the human examiner is directed to pay attention to the one camera where the entropic reading showed a big change.
Figure 21:
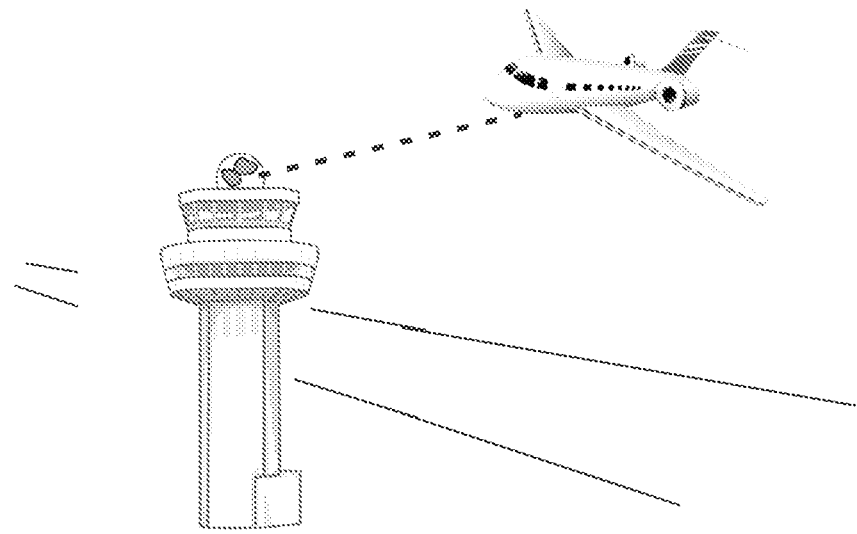
FIG. 21 Entropic Air-Traffic Control This figure shows an air traffic control tower with a projecting cup on which entropic guiding message is being displayed and is being read by approaching guided airplanes.
Figure 22:
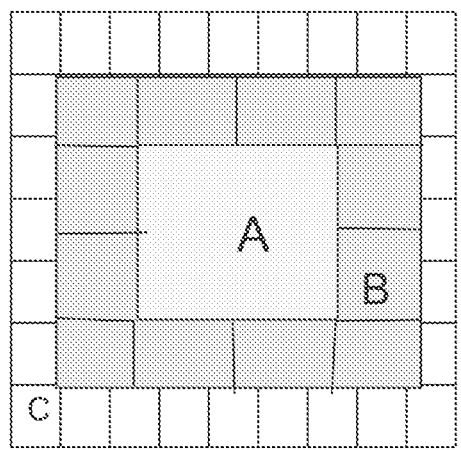
FIG. 22 Significance Orientation Entropic Message This figure shows an entropic canvass with three levels of messages divided by the area dedicated to each message. The most important message A is depicted on the largest area in order to minimize the chances for mis-reading it. The less important messages, class B are written on smaller area, and the C class, the least important, are written on the smallest area.

Shapeless (also called Entropia) is an entropic language based on entropic readings as opposed to shapes and forms. It is robust, versatile, and forge-resistant. The Shapeless language is written into solid material comprised of at least two distinguishable ingredients. The "pen" for writing the Shapeless alphabet is a device that will mix the ingredients in constant entropic state throughout the solid lump where the Shapeless message is written. The reader of the Shapeless message is a device that can discern the entropic state of the examined lump where the Shapeless message is written.

The Shapeless message may be used as a means of communication, or more likely, as a means of material identification—a means to mark a lump of matter, to 'brand' it, to 'sign' it. And as such Shapeless may serve as a useful identification means, preventing errors and forgery. As global shipping increases in volume, such means of establishing identities of shipped and transported items increases in importance.

Shapeless is also efficient for analyzing a video stream and spotting some changes of interest.

Shapeless is a technology, based on the Shapeless language: the means to write in this language and the means to read in this language, followed by means to make good use of such readings.

Theoretical Foundation

Shapeless can be embodied as a permanent inscription on a solid foundation, or it may be screen-displayed for quick messaging and communication. The method of writing is different, the methods of reading is similar.

Physical 'Shapeless' is based on a mixing apparatus that can deliver mixtures of solid ingredients over a range of entropic states. These entropic states may be easily read by a proper entropic reader, and verify the identity of the mixed compound by comparing the reading to a pre-recorded database.

The technology is based on
1. an effective entropic mixing apparatus 2. difficulty to construct a compound to meet a given entropic state 3. speed, versatility, and reliability of the reader of the entropic states.

Entropic States

Let A and B be two homogeneous distinguishable materials. Homogeneous implies that both A and B can be identified as material A and B, for any molecular size and up. Distinguishable implies that upon proper examination there is no confusion whether a lump of matter is A, is B or is neither.

Let A and B also be non-compressible, non-reacting materials. Hence when a volume $V_a$ of material A is mixed together with volume $V_b$ of material B, the mixture M, has a volume $V_m$ which is the sum of the volumes of its ingredients:

$$V_m = V_a + V_b$$

We define a ratio R as:

$$R_{ab} = V_a/V_b$$

Let's assume that the mixture M is stable over time. That means it is not a fluid, but a solid with sufficiently minimal rheological properties.

Every mixture M of materials A and B, has a characteristic ratio, $R_m = R_{ab}$ Let S be a slice, a section, a part of the mixture M ($S \in M$). Any such slice S will have a specific ratio R indicating the proportion of material A, $V_a$ (S), versus the proportion of material B, $V_b$(S): $R_s = V_a(S)/V_b(S)$ The range for $R_s$ is: $0 \leq R_s \leq \infty$ For S approaching the full M: $|S| \to |M|$, we have $R_s \to R_m$; For sufficiently small S, $|S| \to 0$, we have $R_s \to 0$ or $R_s \to \infty$.

Let $S_1, S_2, \ldots S_n$ be n random slices of a mixture M where each slice is of the same volume $V_s = V_{s1}, = V_{s2}, \ldots = V_{sn}$.

The respective ratios of these slices is $R_1, R_2, \ldots R_n$

Together these ratios are regarded as the 'ratio set', $\rho = \rho_n$.

The ratio set may be associated with two properties: (i) representative single value, $R_m$ and (ii) representative uniformity, $U_m$. For example, the ratio set may be reduced to an arithmetic mean to serve as $R_\rho$ and to standard distribution to serve as a uniformity index, $U_\rho$.

Given a sufficiently large n (number of slices) the values of the resultant set, $\rho$, will represent the values of the mixture M that gives rise to the set $\rho$: mixture ration $R_m$, and mixture uniformity $U_m$. We designate $R^*_m$ and $U^*_m$ as the ratio and uniformity values for the set $\rho$ that represent the M values. We will address the various options for $R^*_m(V_s) = f(\rho_n, V_s)$, and $U^*_m(V_s) = f'(\rho_n, V_s)$. The functions f and f' will allow for asymptotic existence:

$$R_m(V_s) = \text{Lim } R^*_m(n) \ldots \text{ for } n \to \infty$$

$$U_m(V_s) = \text{Lim } U^*_m(n) \ldots \text{ for } n \to \infty$$

Both values $R_m(V_s)$ and $U_m(V_s)$ are characteristics of the mixture M.

We regard the pair R and U (ratio and uniformity) of a mixture M of ingredients A and B to together define the entropic state E=F(R, U), for some well defined function F. E—the entropic value of a bilateral mixture M {A:B} may be regarded as a message carried intrinsically within the mixture. The message can be written by setting up ingredients A and B in the desired ratio and in the desired uniformity, so that together they express the value E. Anyone examining the mixture M will be able to measure both the ratio R and the uniformity U of M, and, aware of F, will be able to compute E=F(R·U) and thereby read the message written into M.

Since all these measurements are conducted with a final resolution, there are a finite number of distinct messages associated with such a mixture M. We may regard the set of all possible Shapeless messages as the Entropic Alphabet, or the Shapeless Alphabet. Each distinct message will be regarded as a letter of the Shapeless alphabet: $L_1, L_2, \ldots$.

Mixtures can be concatenated, allowing for letters to be grouped into words, phrases, etc. Such a concatenated construct will be called "An Entropic Page" or "page".

M is therefore analogous to the page where a message is normally written. Message on a page is normally based on shape-specific letters and alphabet. The page needs to be well oriented towards its reader, (e.g. to confuse 6 v. 9), and if part of it is torn, part of the message is lost (e.g. E with the bottom smeared looks as F). Shape-specific letters are vulnerable to erasure and smear of some shape marking, creating confusion or mis-reading. By contrast, the entropic mixture M may be bent, cracked, broken, squeezed and otherwise rough handled—its message in written intrinsically and is properly deciphered regardless of M orientation towards the reader, and also in situations where some of the mixture is hidden or was chipped away. M cannot be inflated, expanded, or retraced because such changes will modify its entropic state. All in all it is the robustness advantage which attracts interest to this 'Shapeless concept' and its associated technology.

Another point of interest is the difficulty of writing a desired entropic message. Unlike shape based alphabet, this, so named entropic alphabet is not easy to write. Relatively complex technology is needed to set up a consistent mixture M where any part thereto of some threshold size and up, exhibits the same ratio, R, and the same uniformity U to express the desired entropic letter (message) E. In practice the error level for R and U will have to be sufficiently small so that the reader will read in M the right message E.

When it comes to protection and against fraud and abuse, the barrier to easy writing of an entropic message becomes important.

While writing an entropic message is not easy, to read a message is much easier, and with proper reading equipment can be done extremely fast and very efficiently. A measuring device may be exposed to any part of sufficient size of M, identify a slice of M, and measure R and U. Since both R and U are intrinsic they remain consistent enough (if properly written) through every set of examined M parts. Therefore the reader will be able to focus on a surface portion of M, viewing that portion as a volume of small thickness. All that is needed is for ingredients A and B to represent themselves in a way that projects to a reading device such that both their relative ratio and their uniformity is computable from these projections. So A and B may reflect light in different colors, or project any other frequency of electromagnetic radiation, or project particles, like electrons, as long as A and B are distinguishable from one another and from other material O which is not A and not B.

Let us divide the $R_m$ range to $I_r$ intervals, and similarly divide the $U_m$ range to $I_u$ intervals. Accordingly, a mixture M of ingredients A and B may have $I_{ru} = I_r * I_u$ distinct identities, as measured over n slices cut from the mixture M. In practice $I_u$ may depend on the value of R, the closer R is to unity, the more distinguishable uniformity values may be observed.

The entropic message E of a mixture M, by default will be regarded as letter L of the entropic or say the shapeless alphabet. Letters can be combined to words, and words to phrases etc. In general E will be the entropic message associated with M.

One may map the Ir intervals chosen for ratio, to be listed each with the number of associated uniformity measurements Iu associated with the given R ratio.

R U
1 X X
2 X X X
3 X X X X
. . . .

Indicating that for higher R there are more uniformity intervals. This list together defines the size the entropic alphabet—the number of distinct signals to be written on M.

As a matter of procedure one will need to agree on a response in the case where a uniformity measurement, U fall too close to the border between two intervals. If U is determined by inspecting a growing number of n slices, then on will simply inspect more slices. A possibility of being unable to decide on a particular uniformity interval may be accounted for.

We now define $\pi_s$ as the average ratio of the ratio set:

$$\pi_s=(1/n)*\Sigma R_i \ldots \text{ for } i=1,2,\ldots n$$

Let U be a uniformity index associated with the mixture m. U indicates to what degree the ratio set is uniform. There are various ways to measure uniformity, any one such method can be selected and used to map into a range of U values such that U=1 implies perfect uniformity ($R_1=R_2=\ldots R_n$) and U=0 implies maximum non-uniformity, namely the ratio set contains a member i where $R_i=0$, or contains a member j where $R_j=\infty$.

Below we will present various ways to define and compute uniformity of a mixture. Right now we will define "Persistent Uniformity" as a uniformity U(s) computed on the basis of s slices, which converges to a limit U*=U (s→∞).

We also define a "consistent mixture" (M*) as a mixture that satisfies the following condition:

Let C be a cut of M such that C>>S. Let $C_1, C_2, \ldots C_c$ be c cuts of M. We will regard mixture M as consistent if:

$$U^*(C_i)=U^*(M)$$

for i=1, 2, . . . c

A mixture is regarded as 'consistent' if every part thereof shows the same uniformity.

Let σ be the scale of uniformity values. That means uniformity is so defined that it can assume one out of σ possible values. In that case the uniformity of a mixture may be regarded as signal, information. An elimination of the 1 to σ uncertainty and replacing it with one value. A consistent mixture will project the same signal regardless which part of it was examined.

Ratio and Uniformity Options

The functions f, and f' mentioned above map the ratio set ρ to mixture representative ratio, $R_m$ and a mixture uniformity index $U_m$.

We discuss several options for such representation.

1. average and standard deviation.
2. universal ratio, and infinity range
3. differential method The entropic letter L written by an entropic mixture M is determined by the ratio between the ingredients A and B and the degree of their mutual distribution. The ratio, R, is normally simple division of the respective quantities. But a variety of definitions may also be used. For example: $R=(Q_a+\delta)/(Q_b+\delta)$, where δ is an agreed constant, designed to prevent division by zero. Or $R=(Q_a)^2/(Q_b)^2$, where $Q_a, Q_b$ are the quantities of A and B respectively.

There are many ways to determine uniformity. They require marking slices on the mixture. Such slices may be marked by some order, like tiles, or may be determined randomly.

Average and Standard Deviation

We can define $$R(\rho_n)=(1/n)*\Sigma R_i \ldots \text{ for } i=1,2,\ldots n$$

And define uniformity as:

$$U(\rho_n)=1-\sigma$$

were σ is the standard deviation of the ratio set, $\rho_n$

Inverse Ratio Method

Given a ratio set $\rho_n$: $R_1, R_2, \ldots R_n$ where $R_i=V_{ai}/V_{bi}$. $V_{ai}$, $V_{bi}$ are the volumes of A and B respectively in slice i.

We will normalize the volumes by dividing the volumes by the volume of the slice, Vs=|S|:

$$A_i=V_{ai}/(V_s*R)$$

$$B_i=V_{bi}/V_s$$

$V_s$ is the volume of each of the n slices. We shall define the universal ration R' as follows:

$$R(\rho_n)=(\Sigma A_i/\Sigma B_i) \ldots \text{ for } i=1,2,\ldots n$$

Lemma:

$$R_m=\text{Lim}(R(\rho_n)) \ldots \text{ for } n\to\infty$$

Proof: Because the n slices are randomly assigned then each element j of M will be counted by $t_j$ slices. And the random slicing dictates $t_1=t_2=\ldots t_n=t$ so:

$$R_m=\text{Lim}(R(\rho_n))=(t*\Sigma A_i/t*\Sigma B_i)=(\Sigma A_i/\Sigma B_i) \ldots \text{ for } i=1, 2,\ldots n$$

One may note that the above relationship is universal regardless of the size of slices, $V_s$.

Uniformity may be computed as follows:

$$U(\rho_n)=1-(\tfrac{2}{3})\Sigma|(A_i+1/B_i+1)-(B_i+1/A_i+1)|$$

As can be seen for $0\leq A_i, B_i\leq 1$, we have $0\leq U\leq 1$

The higher the value of U the closer $A_i$ and $B_i$ are to 0.5.

There are computational advantages to this formula as opposed to standard deviation.

We can write:

$$\text{Lim}[U(S)]=1 \text{ for } S\to M, \text{ or say } |S|\to|M|. \text{ and also:}$$

$$\text{Lim}[U(S)]=0 \text{ for } S\to 0, \text{ or say } |S|\to 0$$

The Differential Method

This method is based on the idea that in a well mixed (high entropy, high uniformity) lump, comprised of equal amounts of ingredients A and B ($V_{am}=V_{bm}$), for any slice, S, not too small, the difference $\Delta_{ab}(S)=|V_a(S)-V_b(S)|\to 0$.

And for the general case where $R=R_m=V_{am}/V_{bm}$, for any slice S, not too small the difference: $\Delta_{ab}(S)=|V_a(S)-RV_b(S)|\to 0$. Choosing A and B so that $R\geq 1$. $V_a(S)$ and $V_b(S)$ are the volumes of ingredients A and B in slice S, respectively.

Given a mixture M, one would randomly 'cut' n slices $S_1, S_2, \ldots S_n$ of equal size $V_s=|S|$. Each slice is 'returned' to mixture M before the next slice is cut. Each slice will be evaluated as to its volume of ingredient A versus the volume of ingredient B: $\{V_a: V_b\}$. Thereby the M evaluator will collect 2n pieces of data, the volumes of A and B in the n slices: $V_{a1}, V_{a2}, \ldots V_{an}, V_{b1}, V_{b2}, \ldots V_{bn}$ Once the data has been collected the M reader will compute its estimate of the ratio value $R_m$ of mixture M:

$$R_n=\Sigma V_{ai}/\Sigma V_{bi} \ldots \text{ for } i=1,2,\ldots n$$

$R_n$ will be the reading (the estimate) of the ratio $R_m$ of M, per the information from the n slices.

The Uniformity of M, $U_m$, will be computed (estimated) per the n slices through the computed uniformity value $U_n$. Estimating $U_m = U_n$. $U_n$ is computed as follows:

$$U_n(S) = 1 - (1/(n*V_s*R_n))\Sigma |R_n V_{ai} - V_{bi}| \ldots \text{for } i=1,2,\ldots n$$

Analysis: the greatest uniformity happens when the A and B ingredients are of same amount, namely the ratio is unit ($R_n=1$), and within every slice within the n evaluated slices, the quantity of A will be equal to the quantity of B: $V_{ai} = V_{bi}$ for i=1, 2, . . . n In that case all the added members: $|V_{ai} - V_{bi}| = 0$, and the uniformity U=1.

Uniformity will be zero, when the ingredients A and B are of equal amount, $R_n=1$, and when every examined slice among the n slices will be full of either ingredient A or ingredient B, but not both. In that case we have: $|V_{ai} - V_{bi}| = V_s$ In that case we have:

$$U_n(S) = 1 - (1/(n*V_s*R_n))\Sigma |V_s| \ldots \text{for } i=1,2,\ldots n$$

$$U_n(S) = 1 - (1/(n*V_s*1))(nV_s) = 0$$

All the other cases are in between $0 \leq U \leq 1$

Illustration

We reference FIG. 1 where a mixture M of size 4×4 squares is comprised of ingredients and A and B at a ratio of 1:3. In FIG. 1a the mixture is not very uniform. A appears in M in chunk of 4 contingent squares. In FIG. 1b, the mixture is more uniform, A appears as individual squares.

The two cases are analyzed by cutting from M n=10 slices of size 4 squares each ($V_s=4$). Each slice is analyzed per volumes A and B in it. The readings for FIG. 1a are: 0-4, 1-3, 0-4, 2-2, 2-2, 2-2, 0-4, 0-4, 0-2, 0-4

Accordingly we have $R_n = 26/7 = 3.71$, which serve to estimate the accurate ratio $R_m = 3$ (in practice one will have much larger n values for much better accuracy). Entering into the uniformity formula:

Cutting the same 10 slices over the distribution in FIG. 1b, where there is greater uniformity we acquire the following readings: 1-3, 1-3, 2-4, 0-4, 3-1, 1-3, 0-4, 0-4, 1-3, 1-3

Accordingly we have $R_n = 32/10 = 3.2$, which is a better estimate for $R_m$ (=3.0), as expected because of the increased uniformity in this case. We then compute:

$$U_{n=10}(S) = 1 - (1/(4*3.2*10))*24.0 = 0.82$$

As expected the uniformity of this one square size distribution is higher than the 4 contingent squares distribution shown above.

The same mixtures were then analyzed with 10 slices of a large size $V_s=6$. The results as shown in FIG. 1c are: 1-5, 2-4, 2-4, 4-2, 0-6, 2-4, 4-2, 0-6, 1-5, 1-5.

Accordingly we compute $R_n = 43/17 = 2.52$, a rough estimate for $R_m = 3$. The uniformity is computed as follows:

$$U_{n=10}(S) = 1 - (1/(6*2.52*10))*38.72 = 0.75$$

Similar to the uniformity achieved for the smaller slice ($V_s=4$).

The same slice size $|S|=6$ is used over the more uniform mixture as in FIG. 1d. The result: 1-5, 2-4, 1-5, 1-5, 2-4, 2-4, 2-4, 1-5, 2-4, 4-2.

Calculating $R_n = 42/18 = 2.33$ The uniformity is computed as follows:

$$U_{n=10}(S) = 1 - (1/(6*2.33*10))*19.26 = 0.87$$

Checking the same with a larger slice $|S|=8$. As in FIG. 1e: 0-8, 1-7, 1-7, 4-4, 2-6, 2-6, 4-4, 4-4, 0-8, 4-4.

Calculating $R_n = 58/22 = 2.63$. The uniformity is computed as follows:

$$U_{n=10}(S) = 1 - (1/(8*2.63*10))*26.20 = 0.87$$

Checking the same with a larger slice $|S|=8$ over the more uniform distribution as in FIG. 1f: 1-7, 2-6, 2-6, 2-6, 2-6, 1-7, 2-6, 2-6, 1-7, 2-6

Calculating $R_n = 63/17 = 3.70$. The uniformity is computed as follows:

$$U_{n=10}(S) = 1 - (1/(8*3.70*10))*19.70 = 0.93$$

This illustration shows that for all sizes of slicing the uniformity ratings are higher for the case of separate squares relative to the case of blocks of 4 squares together.

The Size of the Slice

The entropic reading of a slice S of the entropic mixture M is strongly dependent on the size of S. Clearly:

$$|S| \to 0 : R_s \to \{0, \infty\}, U_s \to 0$$

where $|S|$ is the volume size of S, $R_s$ is the recorded ratio between the entropic ingredients A and B, volume-wise in S, and $U_s$ is the evaluated uniformity between A and B within S. This is because the size of the slice becomes so small that it becomes 100% constructed from either A or B.

Equally clearly is: $|S| \to |M|: R_s \to R_m$, $U_s \to U_m$

Obviously when the slice approaches the dimensions of the mixture, its attributes approach the attributes of the mixture.

The measuring methodology presented here is based on random examinations of some n slices, where $n \to \infty$ for maximum accuracy. In practice, when the result is stable when more and more slices are added then n appears large enough. We use these n measurements to first estimate $R_m$, the ratio for the examined mixture. $R_m$ is best estimated by adding all the A volumes in the various slices and dividing it by all the B volumes. For this method to work it is not important to keep the size of the slices the same.

To estimate the uniformity of M it is necessary to compare R values for the n slices, and here it is important to keep the slice size fixed. The greater the spread of these n ratio values the lower the uniformity.

Generally the aim is to extract as many distinct entropic measurements from a mixture. Therefore one seeks the slice size that would result in as many distinct measurements as possible. This optimum slice size is clearly not at the bounds. A very small size will show low uniformity regardless of the uniformity of the mixture, and a size close in size to the mixture will show high uniformity, regardless of the uniformity of the mixture. So an in between optimum is sought. This optimum may depend on the size of the smallest measured volume, but also on $R_m$. The optimum size size $S_o$ may be found analytically or experimentally.

Consequently: for $0 \leq |S| \leq |M|$, $0 \leq R_s \leq R$

The Iterative Entropic Protocol

The entropic message, E, or say the letter L of an entropic mixture M is determined through two variables: the ratio between the two ingredients A and B, and the distribution of A and B. n slices are marked on M: $S_1, S_2, \ldots S_n$.

Procedure: for n=1, mark $S_n$, compute the ratio $R_n$ for that slice. Since it is one slice the uniformity is $U_n = 1$.

Increment n to n=n+1, now n=2, mark slice $S_n$ on M (randomly or by order), compute the ratio $R_n$ by adding the quantities of A through the slices, and the same for the quantities of B, and divide the two numbers.

Based on the uniformity method chosen use $R_n$ and the values of the quantities of A and B in all the marked slices to determined the uniformity based on the marked n slices: $U_n$.

Compute the entropic letter written on M, L, from $R_n$ and $U_n$: $L_n=f(R_n, U_n)$.

Increment n again: $n=n+1$, mark another slice on M and repeat as before to compute $R_n$ and $U_n$, for the incremented value of n.

The repetition above yields a series of entropic letters. Let the entropic alphabet be comprised of t letters:

$$L_1, L_2, \ldots L_t$$

And the series of letters computed over M as above is:

$$L'_1, L'_2, \ldots L'_n$$

If n is incremented so that:

$$L'_n = L'_{n-1} = \ldots L'_{n-d}$$

For some agreed upon $d=4, 5, \ldots$ then $L'_n$ is the letter associated with M.

The procedure: Keep incrementing n until the above condition is met. If n is incremented more and more and no convergence is observed (by a preset limit), then the computing machine outputs a 'failure' signal.

Multiple Ingredients Entropic States

So far we discussed the binary case: ingredients A and B are mixed into mixture M. We concluded that such a mixture could be marked by an "entropic alphabet" containing $I_{ru}$ letters, or say be marked by one of $I_{ru}$ distinct numbers.

We shall now expand this situation to c components where $c>2$: $C_1, C_2, \ldots C_c$ mixed together into a mixture M. Every pair of ingredients can be used to indicate $I_{ru}$ letters, or say messages, or signatures.

This amounts to an entropic language comprising L messages:

$$L=(0.5*c!/(c-2)!)*I_{ru}$$

Which will allow for 4500 messages to be marked on a mixture of 10 ingredients where $I_{ru}=100$. (Or say an entropic alphabet of size 4500).

Note: we use the term 'component' or 'ingredient' in this entropic context interchangeably.

Ratios Only Language

The main idea in this Entropia (Shapeless) concept is the combined letter based on ratio reading between bilateral ingredients and the degree of uniformity of their distribution in the mix. The ratio information survives when the mixture is deformed, or re-mixed. The uniformity information does not. This raises the option to rely on Zero Entropic language—ignoring the entropy, and reading only the ratios.

The language size |L| in that case will be $I_r$ for the bilateral case. In the case where c components are mixed the number of distinct messages $|L_c|$ will be:

$$|L_c|=I_r^{c-1}$$

Combination Enhancement

Any group p of the c ingredients that are mixed into M may be viewed as a single ingredient A, with any number q of the remaining c-p ingredients being viewed as an opposite ingredient B. In other words, one can treat any p ingredients as a single bilateral ingredient and some other q ingredients to be treated as the opposite bilateral ingredient B.

We can write: $1 \leq p \leq c-1$, and $1 \leq q \leq c-p$.

Such properly defined combinations of ingredients will allow for more $I_{ru}$ signals to be projected from the mixture.

There are $c!/(p!*(c-p)!)$ different sets of p elements out of c for a given value of p. For each such selection the q ingredients are selected from the remaining c-p ingredients, there are $2^{c-p}$ such combinations and hence, using combinations, a mixture of c ingredients could be marked with |L| entropic letters:

$$|L|=0.5*I_{ru}*\Sigma(c!/((c-p)!p!)*2^{c-p} \ldots \text{ for } p=2 \text{ to } p=c-1$$

The multiplication by 0.5 is to account for the fact that every ingredient is counted twice, once as being in the p group and once being in the q group.

Top-Down Entropic Selection

Let one mix $n=2^t$ components $c_1, c_2, \ldots c_2^t$. One will then divide the n components to two groups G0 and G1, where G0 includes components 1 to n/2, and G1 includes all the rest. Counting each member of group G0 as ingredient A and each member of group G1 as ingredient B in an entropic setting, one would then have complete freedom to assign an entropic message E to be written over the two ingredients A and B. Namely one could use any desired ratio, and mix the two ingredients in any desired uniformity.

Next one could divide group G0 to two groups G00, and G01, where G00 contains ingredients 1 to $2^4$, and group G01 contains all the rest. One could regard all the members of group G00 as representing ingredient A', and all members of group G01 as representing ingredient B' in an entropic setting, and have the complete freedom to use any ratio R' and any uniformity index U' to express any entropic message E' between these two groups, G00 and G01.

Similar division to two groups of equal size can be done over group G00, and then on and on, dividing any group to two sub-groups taking the roles of the entropic ingredients A and B, and continue with this division until there are only two ingredients in a group. Each of these actions will allow an entropic writer to use any desired message, or signal for each such binary entropic setting. This amounts to having $2^{n-1}-1$ entropic messages of any desired value written into a mixture comprised of n ingredient.

This is strictly true for n being an exponent of 2. But any other value of n will do, since it is not required to divide ingredients to equal size groups. So n=16 is divided to two groups 8 ingredients each. And each such ground is divided to two sub groups with 4 ingredients in each, which is further divided to 2 groups containing 2 ingredients each: 8-8, 4-4, 4-4, 2-2, 2-2, 2-2, 2-2

But for n=17 one could divide to a group of 10 v. a group of 7 and divide the 10 to 5 v. 5, then to 2 v. 3, while dividing the 7 to 3 v. 4 and dividing the 4 to 2. v. 2: 10-7, 5-5, 2-3, 3-4, 2-2

It is noteworthy that while the above described counting only counts "degrees of freedom," namely bilateral entropic relationships that can be determined irrespective of any other entropic messages, in general there are, many more readings based on any subgroup of ingredients versus any other subgroup of such ingredients.

Tracing

Let a mixture M be comprised of three ingredients: A, B and O. M can be entropically analyzed per ingredients A and B, disregarding the "other", O. Any slice S of M will have some measure of volume for A and some measure of volume for B, and these volumes will define a ratio $R_{ab}$ between these two ingredients. A set of some n such slices will show some measure of uniformity of these R values, so that one could examine M and read in it an entropic message E based on the distributions of ingredients A and B within M.

The above is true even if A and B are small volumes compared to O. That means that one could mark a material O with an entropic message E by injecting into O trace amounts of two ingredients A and B.

Dimensional Reduction

Let an entropic mixture M express an entropic letter L. Let W be an arbitrary slice of M (W∈M). If the entropic letter of such W is also L, then we says that W is a proper entropic subset of M. Obviously if W' is a proper entropic subsets of M and W"∈M is larger than W'(|W"|≥|W'|) then W" is also a proper entropic subset of M. Every M is associated with the smallest proper subset below which the entropic message is different, $W_{min}$.

Given a mixture M comprised of a three-dimensional body, every proper entropic subset thereto, W, will be evaluated to project the same entropic letter L. This implies that an entropic reader exposed only to a $W_{min}$ size of M or higher will be able to read the letter carried by M.

Since all the analysis above was carried out without any restriction on the shape of the proper entropic subset, one can choose a subset of near zero depth and any size of the other two dimensions. In other words one could use a 'skin' type W, a surface. This has practical implications, allowing an entropic reader to read the surface data of a mixture without bothering to look inside. It also implies that cutting M to two such that the newly exposed surface is larger than $W_{min}$ will allow the entropic reader to read E on the exposed surfaces.

Same as the reduction from a three dimensional mixture to a two dimensional subset, so a two dimensional subset may be reduced to a body with two small dimensions and one long dimension, like a rope, as long as the volume in total is equal or larger than $W_{min}$.

Material Verification Setting

We consider a physical solid element X that is known to be in a location, L and time t. As it turns out element X may be located in location L' at time t':

$$X(L,t) \to X(L',t')$$

Owing to the gap in location (ΔL) and/or in time (Δt), there exists a possibility that what is represented as X, is in fact a different physical element, X'≠X.

In other words, over time and over distance element X has been replaced with element X'. Intentionally or by mistake.

In order to make this scenario unlikely one would look for a property P of X ($P_x$), such that the corresponding property for X' ($P_x'$) will be different: $P_x \ne P_x'$ If such a property P is found then in the case where $P_x = P_x'$, the likelihood that X≠X' is minimized, and in the case where $P_x \ne P_x'$ the likelihood that X≠X' is very high.

We conclude then that examination of such property P of some entity X over some distance ΔL and over a time interval Δt, is an effective means to verify identity of physical entities over shipping distances and over time.

Clearly, if more properties of X are found, P', P", . . . and each independently verifies the identity of X, then the confidence in this determination grows.

We will discuss below various mechanisms for a switch X→X', and present the entropic state as an effective property P to verify some entity X.

Material Switch Options

An entity X may be switched to another entity X' over space and time, via:

1. innocent replacement 2. mistaken replacement 3. intended replacement.

The most worrisome option is 'intended replacement' because the replacer may be smart and resourceful, replacing the original entity X with a replacement X' that will very likely be regarded as the original entity by the down the line examiner.

To frustrate such an intending replacer it is necessary to do one or more of the following protective steps:

1. Deny access
2. Conceal the identity of the verification property P
3. Make it too costly to construct a replacement entity X' that would pass as X.

We claim that Shapeless—the solid signature technology is an effective means to verify identity and detect replacement.

The Entropic State Property

We have presented mixture M, of two ingredients A and B which are characterized by two factors $R_m(V_s)$ and $U_m(V_s)$, where $V_s$ is the volume of each of the n slices cut out of M.

We have seen that the mixture M can be characterized by $I_{ru}$ distinct letters. Such letters may be regarded as the entropic signature of the mixture M: E(M). That means that a set of t mixtures M where t≤$I_{ru}$ may be uniquely marked through distinct mixtures of components A and B. The chance of an arbitrary person to guess the correct signature of M is $1/I_{ru}$. Accordingly, entropic state technology (Shapeless) may be used for material identity verification.

The Shapeless technology does not rely on any shape, size or forum attributes of the identified entity. The solid entropic mixture verification signature cannot be wiped off, marked away, washed, removed.

Material Verification Protocols

We may divide Shapeless verification protocols per number of parties involved: discerning three types: 1. single party verification protocols 2. bilateral verification protocols 3. Multi-party verification protocols We may also divide Shapeless verification protocols to: 1. self contained 2. Seals 3. Stamps We also add 'complex verification protocols' 1. Verifying fluids 2. Combined Entropic Mixtures 3. Chemical Cryptography Entropia.

Party Count Classification of Protocols

Discerning:

1. single party verification protocols 2. bilateral verification protocols 3. multi-party verification protocols Single party protocols are usually designed to prevent mistakes and confusion. As well as uncalled for intervention of a second party. They may be invoked on a time interval basis, or they may be invoked per events. Bilateral verification protocols are designed to safeguard shipping integrity of a shipped package. Multi party verification protocols are designed to handle items changing many hands, or splittable items.

Bilateral Verification Protocols

Of three modes:

1. call-back 2. send-along 3. public ledger

In the first mode the recipient calls the dispatcher who instructs the recipient which entropic measurements to take.

The measurements are relayed to the dispatcher who compares them with its prior measurements and accordingly notifies the recipient whether the package is authentic or not.

In the second mode the dispatcher sends the entropic measurements with, or in parallel with, the entropic package for the recipient to verify integrity.

In the third mode, the dispatcher publishes the entropic measurements so that anyone who takes custody of the package can verify its integrity.

Multi Party Verification Protocols

Multi party verification protocols are designed to handle items changing many hands, or splittable items.

Chain of Custody

A package may be sent from a dispatcher D to targets $T_1$, $T_2, \ldots T_g$, sequentially in a fixed or unfixed order. Every target (recipient) will be able to verify the identity (integrity) of the package. The g targets may share verification data with the dispatcher, and each will verify the package in turn. The verification data, (the entropic signature, $\Omega$(package)) may be the same for all g recipients:

$$\Omega(package)_1 = \Omega(package)_2 = \ldots \Omega(package)_g$$

or it may be different:

$$\Omega(package)_1 \neq \Omega(package)_2 \neq \ldots \Omega(package)_g$$

or a combination thereto. Different signatures may be arranged via packages marked with c components, and each recipient is checking a different bilateral entropic pair. This will be important when the dispatcher wishes to authenticate proper receipt of a package by each of the g addressees. When an addressee will claim receipt of the package, the dispatcher will ask it to read particular measurement within a range of multi-ingredients measurements, and then authenticate the receipt by comparing the reported measurement to the dispatcher database. If each target is asked a different set of measurements to measure (and report) then two or more targets cannot collude to cheat the dispatcher.

Illustration. A dispatcher D sends an entropic package to six recipient (targets) $T_1$, $T_2$, $T_3$, $T_4$, $T_5$, $T_6$. D prepares the package as a mixture of three ingredients $C_1$, $C_2$, $C_3$. When $T_1$ receive the package, D asks them to take the entropic measurement based on the bilateral entropic reading between $C_1$ and $C_2$ $\{C_1:C_2\}$. $T_1$ passes the reading to D who measured it before the dispatch and now verifies that $T_1$ receives the package sent to them by D. $T_1$ then passes the package to $T_2$. D then asks $T_2$ to measures the entropic reading based on the bilateral entropy between $C_2$ and $C_3$: $\{C_2:C_3\}$. Again D compares the reading to its own measurement before the dispatch.

The package then moves from target to target.
For $T_3$ the communicated measurement is $\{C_1:C_3\}$
For $T_4$ the communicated measurement is $\{(C_1+C_2):C_3\}$
For $T_5$ the communicated measurement is $\{(C_1+C_3):C_2\}$
For $T_6$ the communicated measurement is $\{(C_3+C_2):C_1\}$

Splittable Verification

An entropic mixture with a µ level consistency can be split to 1/µ parts, where each part is sent to another recipient. Practicing several cases of bilateral specification.

The entropic signature ($\Omega$) is in general a combination of entropic messages forming a word.

Functional Classification of Protocols

We may also divide Shapeless verification protocols according to functionality:
1. self contained 2. Seals 3. Stamps 4. tracings Self contained entropic packages are intrinsically marked with the entropic message. For example, medical pills can be colored green and red and the bilateral entropy is measured. Entropic entity may be fashioned as seals to verify the integrity of what is beyond the seal. The entropic entity may be a "stamp" attached to a device, mainly for the purpose of easy tracking.

Tracing

The entropic ingredients A, and B, may be tracers injected into a third 'carrier' ingredient C. C may be a solid bulk, or it may be a liquid. If C is a turbulent liquid then reading will be limited to analyzing individual trace lump for their entropic message. If C is solid, or is a laminar flow liquid, then reading will also extend to the number of A-B tracers per inspected area or volume of C. If C is transparent then volume reading is feasible.

Complex Verification Protocols

We also add 'complex verification protocols'
1. Verifying fluids 2. Combined Entropic Mixtures 3. Chemical Cryptography Entropia A container with fluid F may be injected with c highly viscous fluids: $C_1, C_2, \ldots C_c$. The combined material is then frozen into solid, and shipped (frozen). At the receiving end the frozen material is examined for its entropic messages, to verify identity.

Illustration: a transparent solution of a biochemical identity, H, is injected with two highly viscous pastes that do not react with H. The pastes are one red and one green. The injected H is frozen and shipped. The recipient, before unfreezing the container, takes an entropic reading of its red-green signature and compares it to the measurement taken at the dispatch. If the measurements agree, then the recipient is assures of authenticity. The package is unfrozen, and injected pastes are being removed and B is used as intended.

Combined Entropic Mixtures

To increase security and reliability one could combine entropic mixtures in many ways.

For example one could use a self-contained mode entropic signature to mark a given entity as a mixture M, then put M in a container sealed by an entropic mixture M', which again might be sealed by a second entropic mixture M", etc.

Also entropic messaging can be done through regular camera reading or through any other electromagnetic radiation. It can be done through the photoelectric effect where ingredient A is releasing electrons with energy $E_a$ upon being shined with a given electromagnetic wave, while ingredient B is not. A current detector will spot whether the area shined is A or B.

Chemical Cryptography Entropia

Using biochemical mechanism an entropic mixture may be comprised of c components $C_1, C_2, \ldots C_c$. Each of these components has a biological activator: $A_1, A_2, \ldots A_c$. The dispatcher and the recipient may have shared the identities of the c components and their activators so that they can measure the entropic entity secretly. Others will not be able to carry out such measurement.

Entropic States Verification Technology

This technology is based on effective construction of an entropic mixer and an entropic reader.

We regard one party as the 'preparer' or 'shipper': the party that prepares an entity X at time t at location L. We regard a second party as the 'recipient' or the 'verifier': the party that examines X against a replacement scenario at time t' and at location L'.

We envision the preparer preparing X with entropic state U, shipping it to the recipient who is reading the shipped entity for its entropic state. The shipper and the recipient compare notes and if they both agree on the entropic state of the entity, they both regard the recipient held entity to be the entity shipped to them by the shipper. If the uniformity states don't agree, a replacement scenario is suspected.

We now discuss the entropic mixing technology and the entropic reading technology.

Entropic Mixing Technology

Discerning between:

1. Two dimensional entropic mixtures 2. Three dimensional entropic mixtures.

To prepare an entropic mixture one could opt to one of the following methods:

1. Mathematical Modeling 2. Entropic Mixing

One could construct a 2D or 3D model to entropically mix c components, then feed the result to a 2D or a 3D printer as the case may be and produce the entropic message. Using a specially designed entropic mixture one could create an entropic mixture of desired readings. There are other ways to construct an entropic message based on mathematical description.

Mathematical Modeling

One can build a deterministic mixture of c components such that they will satisfy a series of entropic values. Clearly for an even c one could define c/2 pairs and solve the mathematical challenge of occupying a volume $V_m$ with the c components such that the entropic values for the c/2 pairs fit any desired list of $E(1,2), E(3,4), \ldots E((c-1),c)$.

We have discussed the case of $c=2^r$ $t=1, 2, \ldots$ dividing the components to two groups $G_1$ and $G_2$, of $2^{t-1}$ each, one may build a mathematical solution for the requirement $E(G_1, G_2)$, and so on until there are two ingredients.

There are various ways to use mathematical modeling to build a desired entropic mixture. We discuss:

1. Cartesian building blocks 2. polar building blocks 3. random inflation

Once the mathematical model of M has been built the result is then translated to a 3D printer feed to construct it. Math modeling is essential for computer screen Entropia Cartesian Building Blocks In this method one divides a designated volume M to cubes of size $\delta^3$, where $\delta$ is an arbitrary measure. M is then comprise of m=xyz such cubes, where $x=M_x/\delta$, $y=M_y/\delta$, and $z=M_z/\delta$, where $M_x$, $M_y$, and $M_z$ are the lengths of M in the three spatial directions x, y and z.

Under this representation the maximum uniformity that can be laid out is when each adjacent cube is of alternative color (we use the term color, to indicate ingredient because in many practical applications the distinction of the ingredients is done via their color). Of course if the slices, $S_1, S_2, \ldots$ are of size $V_s$ where $V_s \ll \delta^3$, then, the smaller $V_s$, the less the uniformity reading of the mixture. However for $V_s > \delta^3$ the uniformity reading will be the highest U=1.

It is now possible to re-assign the colors of the cubes according to some chosen formula where a group of adjacent cubes will share a color. The larger those groups, the lower the uniformity reading per a given slice side. In fact when the grouping is of of t cubes such that $t*\delta^3 \geq V_s$, then uniformity is approaching zero.

Given a choice method for measuring and computing the entropic message E one could model a given color assignment of the m cubes so that the entropic message will be the desired value E.

Note that we use the term message, signal, or letter, interchangeably to denote the information carried by the entropic value E.

The modeling may be stochastic, using random (Monte Carlo) procedures.

The modeling do not necessarily have to be mathematically pre calculated. One could choose a block size (value of m adjacent cubes of same color), then run a metric measurement of the assigned M values (see illustration). The value of R is easy. The value of U (uniformity) may be readily achieved by increasing the value of m if one wishes the desired value of U to be lower than the model indicates. And conversely one would decrease the value of m in order to achieve a higher value of U than is currently measured and computed. This is a classic feedback sequence leading to the desired result.

The designer may also play with the shape of contingent blocks. They don't have to be larger cubes, or 'bricks,' they may be of any shape. One could also use various size blocks and of different shapes, then Monte Carlo model the mixture (the same feedback sequence). The ratio is assigned without difficulty. As to the uniformity. If one wishes it to be larger than what is measured then randomly one would cut down the size of a few blocks of equal color blocks, and measure again. It can be repeated until uniformity is coming close enough to the desired.

Same for the opposite direction if one wishes for the mixture to have uniformity U lower than what is measured, then one would patch together larger blocks of same color cubes.

By adjusting the sizes of the blocks one could adjust the value of the uniformity to be what one desires it to be.

In practice the entropic reading may be conducted over 2 dimensional surfaces, and in that case the cubes will be replaced with squares of size $\delta^2$, but otherwise the procedure are very much the similar. Further reduction may be achieved by collapsing the mixture M into a one dimensional stretch. The basic S elements will then be uni-dimensional intervals.

Polar Building Blocks

Everything discussed over Cartesian elements of M is applicable over polar elements of M. The choice of coordinates depends on the application. If the mixture M is a rolling ball then it is more convenient to mark its surface with polar coordinates.

Random Inflation

In this method one uses ingredient A as 'carrier' namely by default M is 100% ingredient A. Then one randomly assigns some m 'points' (small elements in M) with color B in order to satisfy the desired ratio, R. m is selected so that the B points are uniformly peppered throughout M. Next one randomly increases the size of the B 'points' to larger volumes, or random shapes and eliminates the smaller B volumes to maintain the desired R. After such increase one runs a Monte Carlo model to read the entropic message of M. The B points are randomly inflated (while eliminating the smaller volumes), again and again until the measured uniformity fits the desired uniformity. If an overshoot happens, then one randomly splits the largest blocks of B and measures again. This feedback sequence will achieve the desired entropic message on the mixture M.

Clustering

In this method one divides a target mixture M to m volume elements of a sufficiently small size, and then randomly populates them with color assignment according to the desired ratio: $R=m_a/m_b$ whwere $m=m_a+m_b+m_o$, which are the number of A elements, B elements, and other elements. This will create the highest uniformity per the size of the elements. If lower uniformity is desired then, one will randomly pick c "cluster points" in the mixture M. Each of the m volume elements identified in M (shape is based on which coordinate system is being used), will be identified per its distance from each of the randomly chosen c cluster points. This will define c*m distances. The c cluster points will be set in an arbitrary order. Then one will identify the approximately $h=m_a/c$ elements of color A for which their distance from cluster point 1 is the minimal. And then one would move these elements along the distance from cluster one, such that the distance from cluster one to each of the elements is shrunk by an arbitrary measure σ. Same procedure will be repeated with respect to cluster point #2. One will choose approximately $m'_a/c$ elements, where the $m_a'$ is the number of elements not associated with cluster point 1. Same applied over the remaining elements of color A with respect to the remaining cluster points. When the procedure terminates, then the elements of color A will be more clustered then the before, around the c cluster points. This will result in a lower measured uniformity. By repeating this procedure, the uniformity will further decline. This can be done until the c cluster points represent c blocks of color A elements. If the resultant uniformity is not sufficiently low, then these c cluster points can be regarded as the original distribution and a new set of c'<c cluster points is marked on M, and the above procedure is repeated. There are several other clustering methods. They all fit into the feedback sequence designed to generate the desired uniformity figure.

Entropic Mixing

We describe mixing technology wherein two ingredients can be mixed in a desired mutual ratio, R, and where the uniformity can be measured and adjusted at will. The apparatus, called 'the entropic mixer apparatus' (EMA) is comprised of an entropic mixer element (EM) into which two ingredients A and B are fed, and which outputs a mixture M of A and B. The ratio in the mixer is determined by the feed ratio between ingredients A and B.

The EMA includes a mixture control unit the "Entropic Mixture Controller" (EMC), which controls the feed rate of the ingredients A and B, and controls uniformity parameters ("up") that dictate the operation of the EM.

The EMA also includes an entropic reader, ER, which reads the output flow from the EM, and feeds the reading to the EMC. Based on the reading of the ER the EMC adjusts the uniformity parameters, "up", which in turn results in a new level of uniformity in the output stream. The new level is read by the ER, and the readings are fed into the EMC, which then re-adjusts the "up", and so on until the EMA reaches the desired level of uniformity, and of course the desired level of ratio. Together the ratio, R and the uniformity U, comprise the entropic message E carried by the output stream. As long as the 'up' is kept at its position, the output remains as carrier of the desired entropic message (entropic letter).

The properly mixed output is then carried to the entropic form shaping ("the entropic shaper", ES).

The ES will mold the mixture to the desired form. It may be a three dimensional body or a two-dimensional pasting.

The stable message may also be called an entropic letter. The same letter is generated as long as the 'up' of the EMA are kept stable.

Ahead we discuss the issue of viscosity, and writing complex messages.

Viscosity

The entropic mixing works in a rather narrow band of viscosities. If the ingredients are too viscous, or brittle, entropic mixing cannot be achieved. If the viscosity is too low the desired entropic mixing cannot be fixed. The ingredients will continue to mix and increase the apparent uniformity.

The desired viscosity though must be secured during the mixing only. The resultant mixture may be solidified and made permanent. Accordingly and EMA may include a heater that would heat the ingredients in order to decrease their viscosity to be amendable to mixing. The mixture will then be allowed to cool off and solidify. The mixer may be fitted on the EM or on the feeding line for A and B. If the viscosities are too low, the heater may be replaced by a cooler to bring the viscosity to the desired range.

Complex Entropic Messaging

We have seen that for any given entropic situation, a mixture can have $I_{ru}$ possible values. So each value may be regarded as a letter, while the set of all possible letters is regarded as the entropic alphabet. One would write a codebook matching any of the $I_{ru}$ letters of the entropic language with a particular meaning as the circumstances suggest.

We now describe how to write 'words'—combinations of entropic letters. An entropic word W will be concatenation of some w letters:

$$W=L_1\|L_2\| \ldots \|L_w$$

The description above relates to an EMA which generates a mixture used to calibrate the entropic message of the EMA. This calibration mixture is useless, it is 'entropic junk' (ej). Once the output expresses the right message then the message is right. The EMA may mark this point by injecting a divider feedstock, D that would separate between the junk flow and the proper message flow.

When the EMA wishes to change from letter $L_1$ to the next letter, $L_2$, it again goes through junk output while it adjusts the 'up' to write the desired letter. (If the letter was written before then the adjustment is fast and efficient and the junk between the letters is minimal).

Before outputting the junk, the EMA will again send a shot of divider material D. This will result in letter $L_1$ enclosed between two shots of divider 'fences'. After the second divider comes new junk while the EMA adjusts the 'up'. When the output is calibrated to generate the desired letter $L_2$, the EMA injects another shot of the divider. Now the junk stuff is enclosed between two dividers, and the new mixture flowing out of the EMA is now adjusted to letter $L_2$. The transition between letter $L_2$ and letter $L_3$ works the same way.

In summary, the entire word W will written on a continuous flow of the mixture that looks as follows:

$$W=L_1\|\text{Junk}\|L_2\|\text{junk} \ldots \text{junk}\|L_w$$

This mixture flow then goes through an entropic "junk remover" ("JR"), resulting in the readable letter W:

$$W=L_1\|L_2\| \ldots \|L_w$$

Words may be added to statements. A statement S will be written as a concatenation of some s words:

$$S=W_1\|W_2\| \ldots \|W_s.$$

The separation between one word and the next will be marked either by a second type of a divider material interjected between the words, or by the same divider but with some distinct marking, like larger quantity.

Sentences may be linked to paragraphs and so on.

The Uniformity Parameters

We describe the "up" (uniformity parameters) for the presented entropic mixing apparatus.

The main control variables are the rate of pumping in the two ingredients A and B. The ratio of the rates expressed in volume per second for A and B determines the ratio between A and B in the resulting mixture:

$$R_{ab}=(\Delta A/\Delta T)/(\Delta B/\Delta T)$$

where T expresses time. This is a straight forward way to set up the desired ratio, R for the mixture. This flow rate is determined by setting the pressure that moves the ingredients A and B. The flowing ingredients will have to be viscosity adjusted so that the output uniformity of the mixture will be durable.

The next parameter is the size of the aperture in the stationary disc for both A and B. The larger the aperture the more material is pushed through when the corresponding rotating screen is creating an opening. How much is coming through depends on the pressure difference across the two discs, and on the viscosity of the ingredient. This viscosity can be controlled through the EMA viscosity adjuster (heater or cooler). By heating up the apparatus the viscosity of most ingredients will go down and more material will come through the aperture.

The EMA may be of the kind where the aperture is fixed and so one needs to change the stationary disc or the rotating disc to change the flow opening. But in the case where the aperture is dynamically controlled (like a camera shutter) then the electronic controller will be able to set the aperture size dynamically. Shutter type discs will have to be engineered hard enough to withstand the pressure difference across the disc.

Next control parameter is the rotating speed of the rotating disc that is fitted on the same axis as the stationary disc and is closely adjacent to it. The faster it rotates, the smaller the amounts of both A and B that proceed to the first mixing chamber. Hence the smaller the block of unified material that goes into the mixing. This means that the uniformity of the mixture will be greater. We note that material goes through only when the opening on the rotating disc overlaps the hole of the stationary disc. The stationary disk has at least one hole for ingredient A and one hole for ingredient B. As the rotating disc's hole overlaps with the A-hole, A 'paste' is flowing through the post disc mixing chamber as determined by the size of the flow opening and the pressure gradient across the discs. And then the rotating disc rotates such that its opening overlaps the hole in the stationary disc where the B ingredient is flowing though, and a bulk of ingredient B flows through until, like what happened with A, the rotating disc rotates further, and its opening does not overlap the stationary disc hole. Then the rotating disc rotates again and another chunk of first A and then B is flowing to the next chamber of the entropic mixer. The rotating disc is adjacent and abreast the stationary disc.

The next control parameter is the relative speeds of the two rotating discs that separate between the first mixing chamber and the next, as well as the sizes of the respective apertures.

The $2^{nd}$ pair of discs are both rotating. In opposite directions. Their speed and the design of their apertures will affect the degree of mixing effected by the apparatus. The relative speeds of the counter rotating pair of discs is adjusted to determine the sequence of locations in the chamber where the flow continues to the next chamber (where another pair of counter rotating discs is fitted, or for the last chamber the flow goes out of the mixer).

The holes of the counter rotating discs are of same size and shape and they are both situated on the disk so that when the discs counter rotate there is an instant of time where the holes in the two discs overlap, and the mixture flows through them. Then the discs keep moving in opposite direction and until they meet again they admit no flow through them. The first disc will be rotating at an angular speed $w_1$, and the second disk will be rotating at angular speed $w_2$, such that $w_2=k w_1$, where k is the configuration coefficient. If we take time point t=0 as a starting point where the two counter rotating discs overlap with their respective holes, and we wish for a period T to be marked before the holes overlap again, then we can write:

$$T(w_1+w_2)=2\pi$$

And modify it to: $T(w_1+kw_1)=2\pi$ which leads to $w_1=2\pi/(T(1+k))$ and $w_2=2\pi k/(T(1+k))$.

If k=1 $w_1=w_2=\pi/T$ and in that case the next overlap will be exactly opposite the location where the starting overlap took place. For k=2 the next overlap will happen 120 degrees away from the former overlap, and so on 120 degrees apart. For k=3 the next overlap will happen $\pi/4$ (90 degrees) apart. This sequence of locations and the period T, has a strong impact on the resulting uniformity of the mixture. The speed and aperture sizes of the counter rotating discs separating every mixing chamber in the EMA are all mixing parameters.

Entropic Reading Technology

The basic technology of digital photography is the natural means for entropic reading. Today the resolution is very high so that small areas may be read with a large number of pixels which will identify A color versus a B color.

Every superficial reading will do. It may be a naturally emitting radiation, or a stimulated radiation. The radiation frequency may be any frequency that can be reliably measured. There is a need to distinguish between two frequencies to distinguish between A and B. Similarly the photoelectric effect can be used to distinguish between A and B by their photoelectric response to a given radiation frequency.

Photographic entropic reading is not affected by the relative disposition of the reader versus the examined surface.

An entropic message may be written robustly so that if the examined surface is partially dirty, smeared, covered, the reader may overcome this disturbance. In fact, a reader may develop a credible estimate as to the accuracy of its reading based on the dirt or smear level of examined surface.

Entropic Error Recovery

Entropic reading is robust. If part of the inspected surface is covered, or misread, the entropic message may still be recovered. This applies to letters, words or sentences written in Entropia language. We describe ahead two reading errors recover methods: 1. worst case scenario, and 2. most plausible case scenario.

In cases where an error in reading has a critical effect, one will lean towards the worst case scenario where an error recovery is most likely to be accurate, and in other times the plausible case scenario is more plausible choice.

Worst Case Error Recovery Method

Consider a mixture M of two ingredients A and B, and consider an entropic reader with a reading resolution that identifies m pixels or reading units on the surface of M. a of these pixels are color A, b of these pixels are colored B, but u pixels are unidentified, as to whether they are colored A or B. This is because these pixels are covered, smeared, dirty, etc. Using any selected method one reads M as if the u pixels are either all A or either all B.

One first assumes that every unidentified pixel is an A pixel. Based on this example the ER evaluates the entropic message $E_a$ of M. Next one assumes that every unidentified pixel is a B pixel, and accordingly evaluates the entropic message of M—$E_b$.

In the case that $E_a=E_b$, the ER assumes that this is the correct reading of mixture M. That is because it stays the same message in both extreme cases where all unidentified pixels are marked all in one color. The confidence in having the right reading is high.

Obviously the larger the ratio of u compares to a and b, the more likely it will be that $E_a \neq E_b$, and in that case the ER will report "unable to read the mixture".

Plausible Case Error Recovery Method

We repeat the case described in the worst-case scenario. Only that we color the unidentified pixels differently. Reading the readable a+b pixels, one computes the ration $R_{ab}=a/b$. And then randomly assigns A or B colors to the u unidentified pixels such that a' of these pixels are marked color A and b' of these u pixels are marked color B, and a' and b' maintains the ratio: $R_{ab}=a'/b'$. Once so marked the ER determines the entropic message of M: $E_1$.

The above procedure of randomly marking the u unidentified pixels is then repeated t times. Each time the entropic message E is evaluated. This yields a series of measurements: $E_1, E_2, \ldots E_t$ One then sets an a-priori confidence level, CL: $0 \leq CL \leq 1$. If a count of t*CL entropic messages are the same message, then this message is the plausible reading of M. If there is no t*CL count of cases that agree on the same message then the ER announces the mixture M as unreadable.

Alternatively, the ER may retry the above method over a lower confidence level CL'<CL.

As a matter of protocol the ER may keep lowering the confidence level until it evaluates to a reading, which is then reported along with the confidence level associated with it.

Of course, the larger the number of rounds (large t) the more reliable the method.

The Entropic Photoelectric Effect

Entropic message can be established by mixing two chemical elements A and B such that they are distinguishable by their photoelectric properties. Let T be a threshold electromagnetic radiation such that when T is projected upon A, it triggers the photoelectric effect, namely A release electrons which may be attracted to a near by positive electrode and register an electrical current. However when radiation T is projected on element B, it does not have a sufficiently high frequency to release electrons from B, so no current will be registered. A device that glides above a mixture of A and B will be able to map the mixture as to its entropic properties.

The photoelectric mixture as described may be comprised of elements of similar color, so the messaging may not be very visible.

Entropia—Applications

We discuss:

1. material identity verification 2. communication technology 3. visual alert 4. Tactile and dark applications Material Identity Verification This application relates to shipping, material authenticity (preventing fraud), material handling (preventing errors and mistakes).

Advantages: robustness of accurate reading, adjusting error risk.

Adjusting Error Risk

A message M may be comprised of an important part $M_i$ and a less important part $M_l$. Using entropic language, M can be written such that $M_i$ is expressed on a larger mixture, and $M_l$ on a smaller mixture. Same for several level of importance. Thereby the chance of misreading $M_i$ is lower than the chance of misreading $M_l$.

Categories:

1. Shipping Applications 2. Automated Assembly and Handling 3. Human tracking 4. Vehicle Tracking.

Shipping Applications

Items in shipping are put together in different modes and order. If identity is marked by a shape based alphabet as a label, then it may be that the label is not accessible, covered, and dirtied up. The shapeless message will be readable from any direction, even if some of the surface is covered up.

Automated Assembly and Handling

Items rolling on an assembly line, are rotated and swiveled so that shape based labeling may be hard to read. When items are piled up a different surface is visible for each package. Shapeless has an advantage. Piles of lumber and other items on construction site may be covered with 'shapeless' labels readable from a surveying helicopter.

Human Tracking

People can wear hats, helmets, bandanas, and sleeve cuffs shapelessly marked so they can be tracked via CCTV or flying camera even in a big crowd.

Vehicle Tracking

Entropic roofs or entropic blankets may be shapelessly marked and surveyed from the air or from a bridge, etc.

Mail Sorting

The challenge of a mail system is that packages and envelopes are gleaned from dispatch locations and must be sorted first on big categories of destination and then to more refined definitions of destinations. In the normal way an address is written this is not easy to do. Using Shapeless, the big categories of destination—destination zones—will be entropically marked on the package for quick sorting, followed later by refined sorting for delivery.

Entropic Communication Technology

The entropic alphabet can be used to 'paint surfaces' with a message, that is subsequently read by a proper reader, which may be a simple digital camera. The competition for entropic messaging is (i) nominal alphabet, and (ii) bar codes and QR.

Both nominal alphabet and QR are more efficient with respect to information density per surface area. Hence both are nominally much preferred to Entropia. Alas, Entropia may be used in a cryptographic context, and it has an advantage in situations when readability is disturbed, or is done from awkward position. Entropia can also be used in combination with other languages, either next to each other or in overlap.

Entropia can be written on curved and wavy, or even folded surfaces, for which its competition is intolerant.

The basic configuration for Entropia communication is: an entropic writer painting a display board (normally a computer screen), a camera capturing the screen, feeding the captured screen into an entropic reader, which interprets and outputs the message prepared by the entropic writer.

Entropic Screen Construction

Unlike the task of embedding an entropic message into a lump of matter, screen construction is more straight forward. One first decides on the desired entropic message $E(R,U)$—the ratio level, and the uniformity level. One then decides on the size of the display, D, (the equivalent to the M value in the material verification version). D=M is decided in terms of its pixel size, say m=pq pixels, for a rectangular with dimensions p and q. It is important that m is adjusted so that there is a solution for the following equation: $R=x/(m-x)$ If one then marks D with a=x pixels with color A, and b=m−a pixels with color B, then the A-B ratio on D will be the desired value R.

The question now is how to distribute the a A color pixel and the b B color pixels. We assume without losing generality that a≤b.

The maximum uniformity over D with R will be when every A pixel is adjacent to only B pixels: $U_{max}$. The smallest uniformity will be when all the a A pixels are in maximum adjacency, one rectangular block all of A pixels: $U_{max}$.

The values of $U_{min}$, and $U_{max}$ depend on the chosen size of the slice S. The 'uniformity span' $\Delta U = U_{max} - U_{min}$ is higher for larger slice S, and is highest for the case where the slice fits display. $\Delta U \to \Delta U_{max}$ for $|S| \to |D|$ And also $d\Delta U/d|S| > 0$ One needs to choose a slice S such that the desired uniformity value of the message $U=U_m$ will be within the limits: $U_{min}(S) \leq U_m \leq U_{max}(S)$ Now the the challenge is to find the distribution of pixels that will be read as uniformity $U_m$.

There are analytic solutions to this challenge that can be programmed to the entropic message writer. But it can also be accomplished with trial and error.

The entropic message writer, starting from either side, say from the low uniformity side: will put a block of a A pixels somewhere, and then apply the standard differential analysis to read the uniformity of the display. If the read uniformity, $U_r$ is smaller than the desired uniformity $U_m$ then one will choose some method to randomly break apart some contiguous A pixels and re-read the resultant uniformity. If the read uniformity $U_r$ is higher than the desired uniformity $U_m$, then one will randomly attach some disjoint blocks of A pixels, and measure the resultant uniformity. The message writer thereby has means to affect both the increase of the uniformity reading and its decrease. By applying these two means in a feedback cycle, then over some adjusting rounds the message writer will achieve the desired uniformity reading on the screen. $U_r = U_m$.

After some time the entropic message writer will have a database for block sizing for various desired entropic messages.

Superimposing Shape and Shapeless Alphabet

Consider a screen carrying a shape-based message written say in Latin letters.

The letters are marked with a dark color, "ink", and the background, the "page," is marked with a light color. The same size screen with the same number of pixels may be entropically marked via two colors A and B. Each of the 'shapeless' pixels will be marked by a color for A or a color for B. So we have one 'shape based' screen and an equal size 'shapeless' screen. One shape based message, and one entropic shapeless message. If the two screens are superimposed then each pixel will be marked by one of the four combinations: A-ink, A-page, B-ink, B-page. One can now use two distinct shades of light background colors, $L_1$ and $L_2$, such that a human reader will not distinguish between them. And one could further use two shades of dark ink colors, $D_1$, $D_2$ so that a human reader will not distinguish between them.

To affect the superimposition one will mark each background "page" pixel on the shape-based screen as $L_1$ if that pixel is marked as A color on the entropic screen, and will mark every "page" pixel on the shape based screen as $L_2$, if that pixel is marked as color B on the entropic screen.

One will also mark every "ink" pixel on the shape based screen with shade $D_1$ if that pixel is marked as color A on the entropic screen. And every "ink" pixel on the shape based screen that is marked as color B on the entropic screen will be marked as $D_2$.

This superimposition will allow the human reader, or a camera that simulates human reading, to read the shape-based message clearly because the distinction between $L_1$ and $L_2$, as well as the distinction between $D_1$ and $D_2$ will not be discerned by the human reader.

The same superimposed screen will be readable by a camera that does distinguish between $L_1$ and $L_2$, as well as between $D_1$, and $D_2$. That distinguishing camera will interpret all pixels marked as $L_1$ or as $D_1$ as color A and interpret every pixel marked as $L_2$ or $D_2$ as color B. That camera will then feed a computing machine that will read the entropic message of the screen.

As described, except for limitation on size of messages, every superimposed screen can carry two arbitrary messages, one through the shape-based interpretation of the superimposed screen and one through the shapeless based interpretation thereto.

This superimposition can be enhanced by allowing some/shades of light: $L_1, L_2, \ldots L_l$ and d shades of dark: $D_1, D_2, \ldots D_d$ to be used. The human reader will not distinguish between the shades and comfortably read the shape based message on the screen but the entropic reader will read several bilateral entropic messages on the same screen.

The multiplicity of shades can be used to add boundaries, say a fence color F to mark the boundary of a screen slice used to express an entropic letter through colors A and B. The F color can be used to combine letters to words, and words to phrases etc. All in a superimposed way relative to the shape based message. There is room for optimization. If one desires to write a message M on a given screen SC using colors A and B for the lettering, and using a fencing color F to bound letters and put them next to each other to form words, then the size of the boundaries, as well as the size of the alphabets is subject to optimization.

The entropic message superimposed on the shape based message can be a signature S computed by a unique key of the writer, K: M=f(M*, K) where M* is the shape-based message of the superimposed screen. M will then be written on the same screen. f may represent encryption or a hash.

A reader aware of the key K used by the writer will read the shape based message M*, compute M=f(M*,K), and check if the computation matches the M message read entropically on the screen. This will assure the reader that the shape-based message is authentic, written by the writer who owns key K. This signature may take any symmetric cipher as its base. It can also be used in an asymmetric setting where the writer of the shape based message, M*, will use a private key $K_{pr}$ to encrypt M* to M while the reader will use the public key of the writer $K_{pu}$ to compute M* from M and check that the computation and the identified M message agree. If they do, then the reader develops confidence in the authenticity of the shape based message.

Cryptographic Applications

The cryptographic applications of Entropia have several aspects. First the code book that interprets entropic values may be a shared secret. Second, the size of the slice may be a shared secret. Different slice sizes yield different entropic readings, and the size of the slice is not given in the display or on the mixture. Third aspect relates to multi component Entrpoia, where the attacker does not know what is the bilateral combination that is to be read, among the many possibilities.

Inherently the same message delivered entropically several times is delivered differently every time. Making it difficult to practice chosen plaintext attack.

The shape of a shapeless message may be used as subliminal language attached to the entropic message, or alternatively the shapeless message can be regarded as a subliminal message relative to the shape-based message. The association between these two types of messages opens this procedure to many of the applications of such message association, like the applications identified in U.S. patent Ser. No. 10/395,053.

The entropic message may be written randomly as shown above, so every one who writes it will generate a different picture (shape).

Bit Wise Entropia

A square of w*w bits will allow for $I_r = w^2 - 1$ letters based on ratio only. Adding uniformity will greatly increase the size of the alphabet associated with this square. If the entropic message is read through random slices, say of size 16 bits, then even the simple case where ingredient A is one bit and ingredient B the other 15 bits, will have three or more entropic message. Placing the A bit in the middle of the square or close to it, will yield a different uniformity reading when compared to placing the A bit at the corner of the square or at its side.

Illustration: the uniformity of case I is different from the uniformity of case II and Case III below.

Case 1: entropic mixture M is 3*3 squares (w=3) with ratio R=1/8. The A ingredient, marked as '1' is placed in the middle, and the ingredient B—zeros are placed around:

0 0 0

0 1 0

0 0 0

Case II—as above but the mapping is as follows:

0 0 1

0 0 0

0 0 0

Case III: as above with mapping as follows:

0 0 0

0 0 1

0 0 0

For slices of size 2 bits and above. For slices of size one bit, the three above cases will yield the same uniformity reading (and hence the same entropic reading because the ratio is the same). And for a slice the size of M (3*3) also the reading is the same. But for square slices, say of the form (size 4 bits):

X X

X X

Case 1 will catch the A bits more times because it is in the middle. There are 4 possible slice of size 2×2 bits square. All four of them will catch the A bit. Alas only one of the four slices will catch A in Case II, and two slice will catch A in Case III. Therefore the entropic message of the three cases will be different.

Specifically, a 2×2 slice without A (all 4 bits are B) will have the following uniformities:

Case I: Each slice contains 3 B and 1 A. Computing $R_4=(3+3+3+3)/(1+1+1+1)=3$. Now $$U=1-(1/(1/4*3*4))((1*4-4)+(1*4-4)+(1*4-4)+(1*4-4))=1.00$$

Case II. One slice contains 1 A and 3 B, and the three other slices are all B. Hence $R_4=(4+4+4+3)/(0+0+0+1)=15$. Computing:

$$U=1-(1/(4*15*4))((4-0)+(4-0)+(4-0)+|(3-1*15)|)=0.90$$

Case III: two slices contain 1 A, two slices contain no A. Computing $R_4=(4+4+3+3)/(0+0+1+1)=7$. Computing:

$$U=1-(1/(4*7*4))((4-0)+(4-0)+|(3-1*7)|+|(3-1*7)|)=0.86$$

The above illustration points out that for a bit-wise mixture of size p bits over q bits, using the differential method, any sequence of the $2^{pq}$ combinations will be associated with an Entropic letter defined over a well defined set of slices, say a slice of p' bits over q' bits. One would simply evaluate all the possible slices of p'×q' size, and use the differential formula to compute R and U as in the illustration above, and from these values identify the entropic message—the entropic letter. This will map bit matrices of any size to a uniformity number $0 \leq U \leq 1$. It will identify matrices of size p×q sharing the same uniformity and entropic letters. This determinism in computing entropic message gives rise to various cryptographic protocols.

Visual Alert

A tool to notice changes of interest in a monitoring video camera. In many situations today a large number of CCTV cameras are trained on public places, or military targets as the case may be. There are generally not enough people to keep watch of these TV cameras. There are also not enough AI processors to apply serious inference engines operation on the video stream. This situation may be helped with Entropia.

As the video is displayed, it is constantly analyzed by an entropic reader. Reading does not have to be accurate, it has to be fast. The entropic camera may sample frequent frames in the video stream, and analyze them. As soon as the analysis is complete the entropic camera samples another frame in the video stream. If the entropic message of the screen undergoes a great change, especially if sudden, then this video is becoming of interest. Case in point: dozens of CCTV around a plant are surveying what is in front of them. Nothing much happens normally, and a human surveyor cannot be expected to pay much attention. When normal workers go back and forth in the surveyed area, the picture changes, but the entropic message stays very much the same. However, suppose that fire erupts in some location. The CCTV camera video will be entropically analyzed and a big change will be noticed, so that video stream will be sent for a human evaluator to analyze. This entropic surveillance will also work if someone quickly opens a lock door and gets in. The movement of the person and the opened door will be registered as an entropic change of interest. The implementer will decide on the threshold of change to be reported.

Once a camera is recognized as warranting interest, it can be submitted to human monitoring for human analysis. In a larger arrangement, there may be a small number of highly powerful AI engines which can analyze only a small fraction of the total number of CCTV cameras. In that case, any camera that was triggered by Entropic alert will be forwarded for further analysis at AI grades.

What is the advantage of Entropia?

A video camera, trained on a public place, or other certain places, shows people coming and going, trees blowing in the wind, birds flying animal walk by, cars, clouds, rain, etc. Such innocent changes to the video picture are of no special interest. But if fire breaks out, a flood happens, someone scales a wall, or cuts a wire, a crowd walks in—these are changes that need attention. It is therefore important to differentiate between normal video dynamics and abnormal dynamics where attention is needed. Today there are anticipatory algorithms for that purpose. They are programmed to recognize a fire, or a crowd for example. But anticipatory algorithms cannot anticipate what a creative attacker will do. The Entropic solution is to constantly monitor the entropic message of the video. A moving cloud, a flying bird, paper flying in the wind, etc., will not modify the entropic reading a video. But a fire, a flood, a big crowd will be evaluated to a different entropic reading, and trigger the alert.

It is clear that it is not necessary to measure the entropic message accurately, because only the dynamics is of interest.

The entropic reading can be done over black v. white, red v. blue, green v. yellow, etc. or any combination thereto.

Tactile and Dark Applications

Nominal Reading in dark environments is impossible. A tactile solution is called for. While it is possible to read shape-based alphabet with human or machine touch (Braille alphabet), it is error prone, on account of position and orientation. By contrast shapeless alphabet is much more conducive to dark reading.

A surface may be marked with smooth section (ingredient A) and rough sections (ingredient B), a tactile apparatus feeling itself on the surface at a known speed with say randomized direction of movement, will read A areas versus B areas, and interpret the shapeless message of the inspected surface.

Roughness gradient of surfaces may also be used for reading through measuring returned light from a light projector (or any other properly distinguished electromagnetic radiation).

Roughness may be set in various identified degrees, and thereby use the tactile format for multi component entropic messaging.

Rock of Randomness

U.S. Pat. No. 10,467,522 describes a "rock of randomness" comprised of some n constituents marked with diverse electrical resistance. The idea behind the rock is that these constituents should be randomly mixed but not at high uniformity. The rock describes a 3D printing technique to construct such a rock of randomness. This invention offers another technology for that purpose. An entropic mixer apparatus could be set to mix the required n constituents in the desired way. This will be an application of the physical apparatus for other than writing an entropic message.

Human Reading

The human eye will naturally distinguish between sufficiently different entropic letters. Which suggests a 'reduced entropic language' reliably readable by just looking. There are countless applications where signals are important in some complex situations, perhaps of emergency and rescue. We normally use colored flags to communicate basic messages. E.g. red and white flags on a beach. We indicate a 'country' by its particular flag. The entropic concept will simply push this communication channel further. Parameters are: the choice of the pair of colors to look at, the ratio of the quantities between these colors, and the uniformity of the mix. The human eye can easily distinguish between two colors in three ratio modes: 90%:10%, 50%:50%, 10%:90%. The human eye can also easily distinguish between three uniformity modes: (i) isolated large blocks for each color, (ii) small size isolated blocks for each color, and (iii) a thorough mixture of the two colors. Tests may indicate that the human eye is more sensitive than that. When the ratio is very much off (one colors dominates) uniformity distinction is more difficult than when the two colors are roughly equal, but all in all it looks like an alphabet of 9 letters is a practical arrangement. Hence a flag that is comprised of three patches, each showing an entropic letter through a different pair of colors (e.g. red-blue, green-black, yellow-grey), will be able to display words comprised of 3 letters, from an alphabet of 9 letters: $9^3$=729 distinct messages. This is sufficiently rich to convey critical information in an emergency. There is a good chance that with some training people will be able to read much richer entropic messages with no camera aid, just by looking.

Overview of the Invented Technology

1. This invention describes a method to express information with an alphabet that is not based on shapes, forms, and fixed geometry of its letters, a "shapeless alphabet", by mixing two ingredients A and B into a mixture M, wherein the ratio between the ingredients, and the uniformity of the mixture together express a letter of the shapeless alphabet, and where the ratio between the ingredients, R is defined as the $R=Q_a/Q_b$, where $Q_a$ an $Q_b$ are the quantities of ingredients A and B respectively, such that $Q_m$ is the quantity of the mixture M, where $Q_m=Q_a+Q_b$, and where the uniformity of M is measured relative to slices $S_1, S_2, \ldots S_n$ marked randomly on M, such that their sizes are all the same, $Q_s$, and equal to $Q_s \leq Q_m$, and the uniformity of the quantitative ratios between ingredients A and B in the n slices, $R_i=Q_{ai}/Q_{bi}$, for $i=1, 2, \ldots n$, for $n \rightarrow \infty$, expresses the uniformity, U, of the mixture M, and where the shapeless alphabet letter, L, that is expressed by M is a function of R and U: $L=f(R,U)$.

2. This invention describes a system to mix two viscous incompressible chemical ingredients A and B to create a mixture M such that the ratio R between the volume of A, $V_a$, and the volume of b, $V_b$ in M is a given ratio, and such that the uniformity of the mixture M is of desired value, U, where U is defined as follows: (i) one randomly marks n slices on M where all the slices are of volume $V_s \leq V_m$, where $V_m$ is the volume of M, then (ii) one measures the n ratios between ingredients A and B in each of the n slices, and uses a certain established uniformity calculating formula to compute the uniformity U of M, from the n ratio values, for a pre-established value of n.

3. This invention describes a system to create a surface M, comprised of smooth area, A, and rough and uneven area B, where the ratio between the surface size of the smooth patches, $P_a$, and the surface size of the rough patches, $P_b$, is an arbitrary value $R=P_a/P_b$, and where the uniformity between the smooth and the rough patches, is an arbitrary value U, where U is defined as follows: (i) one randomly marks n sectors on M where all the sectors are of area $A_s \leq A_m$, where $A_m$ is the area of M, then (ii) one measures the n ratios between patches of A and patches of B in each of the n sectors, and uses a certain established uniformity calculating formula to compute the uniformity U of M, from the n ratio values, for a pre-established value of n.

4. This invention describes a method as in (1) wherein the uniformity U of M is computed via the following formula:

$$U=1-(1/(Q_s*R_n*n))\Sigma_n |R_n Q_{ai}-Q_{bi}| \ldots \text{ for } i=1,2,\ldots$$

where:

$$R_n=\Sigma Q_{ai}/\Sigma Q_{bi} \ldots \text{ for } i=1,2,\ldots n$$

and $R=R_n$.

5. This invention describes a method as in (1) wherein the ingredients A and B are incompressible viscous fluids, with no mutual chemical reaction, and where the mixture M is either a viscous fluid or a solid construction; and where the quantities of ingredients A and B are measured as volumes, and where the slices may be arbitrary parts of the mixture, or they may be thin slices, namely having one spatial dimension very small, or they may be line-type slices, having two spatial dimensions very small.

6. This invention describes a method as (1) wherein t>2 ingredients $I_1, I_2, \ldots I_t$ are mixed into a mixture M, such that any two ingredients i and j, i, j=1, 2, . . . t define a Shapeless letter $L_{ij}=f(R_{ij}, U_{ij})$, where $R_{ij}$, and $U_{ij}$ are the entropic ratios and entropic uniformities defined over ingredients $I_i$, and $I_j$, and where any set of the t ingredients, α, may be regarded as a single ingredient A, while any set of the t ingredients, β, may be regarded as a single ingredient B, such that when sets α and β are mutually exclusive, these two sets will define an entropic letter $L_{\alpha\beta}=f(R_{\alpha\beta}, U_{\alpha\beta})$, where $R_{\alpha\beta}$ and $U_{\alpha\beta}$ are the ratio and uniformity for α, and β.

7. This invention describes a method as in (1) where the A, B ingredients are superficial areas marked on a computer screen, which are set dynamically by a computing machine that expresses an arbitrary message T by writing successive entropic letters $L_1, L_2, \ldots$ on the screen, and where the screen is captured by one or more cameras each sending the screen picture into a reading computing machine, which interprets the entropic letters $L_1, L_2, \ldots$ into T.

8. This invention describes a method as in (1) where a pair of colors in a video stream are regarded as ingredients A and B, such that each frame of the video stream may be regarded as a mixture $M_{video}$ comprised of colors A and B and all other colors, which are neither A nor B such that every frame $F_i$ of the video stream may be interpreted as carrying an entropic letter $L_i$ defined by the ingredients A and B, resulting in the video projecting a message comprised of letters $L_1, L_2, \ldots$.

9. This invention describes a system in (2) where the mixture M is created via an apparatus comprised of an "entropic mixer", EM that mixes ingredients A and B into a mixture stream M, which in turn is read by an "entropic reader" ER to determine the entropic letter L written into M, and where this reading is communicated to an entropic controller, EC, which compares the reading, L, to a set point value, $L_{sp}$ given to it, and then the EC adjusts operational parameters in the EM in order to generate M with the desired set point letter $L_{sp}$, the adjusted mixture stream M is again read by the ER that evaluates its entropic letter L', and communicates L' to the EC, which again adjusts the operational parameters of EM until $L_{sp}=L_m$, where $L_m$ is the letter written on M when the feedback control sequence is completed.

10. This invention describes a system in (9) where the EM is comprised of two feeding lines for ingredients A and B such that the EC controls the flow rates of A and B, and where the feed lines terminate in a first contraption comprised of two discs mounted perpendicular to the flow of the ingredients, fitting snugly into the flow pipe for A and B, and where one disc is stationary, and one disc is rotating at a speed controlled by the EC, and where the stationary disc is drilled with holes of a set size, one hole allowing ingredient A to flow through and one hole allowing ingredient B to flow through, and where the rotating disc, rotates abreast and next to the stationary disc, and it has a single hole drilled into it, such that when this rotating hole overlaps with the hole for A in the stationary disc, ingredient A flows through, and when this rotating hole overlaps the hole for B in the stationary disc, ingredient B flows through, and where the alternating disc-flow-through quantities of A and B that flow beyond the first two disc contraption, keep flowing to a second two disc contraption which are perpendicular to the flow of ingredients A and B, and which fit snugly into the flow pipe, and where the two discs rotate in opposite directions, and each has a hole in it, and when the two holes overlap the mixture of A and B flows through; the flow then meets another one or more two disc contraptions of the second type, and after the last two disc contraption the mixture is let outside from the EM; the holes in the various discs may be changed and controlled by the EC, so is the speed of rotation of every disc in the contraption, such control is used to generate a mixture M associated with letter $L_m$ which is the same as the desired, set point $L_{sp}=L_m$ 11. This invention describes a system as in (3) where a surface is evaluated via an entropic reader projecting a laser beam onto the surface at an angle $\alpha$ off the perpendicular of the surface, where a smooth area on the surface reflects the beam with another beam of the same angle $\alpha$, such that the two beams mark an angle $2\alpha$ between them, while a rough area of the surface will scatter the incoming beam, and where the entropic reader will measure the amount of radiation reflected at angle $\alpha$, and thereby determine if the evaluated spot is smooth (ingredient A), or rough (ingredient B), the projected beam and the reflection reader are mounted on a structure that moves above the examined surface and thereby maps the entropic state of the surface with respect to A and B.

12. This invention describes a system as in (3) where established metrics of roughness and smoothness are used to mark a surface with t distinct states of roughness-smoothness, such that any two such states can define an entropic message over the surface where the smooth and rough spots are marked.

13. This invention describes a method as in (1) where a first screen S comprised of pxq pixels is set to express a shape-based letter like a letter from the Latin alphabet by coloring some g<pq pixels with a light color, to serve as the "page", the background, and coloring the other pq-g pixels with a dark color, "ink", such that the shape marked by the ink surrounded by the page, displays a visual letter, or several letters from the Latin alphabet, and where a second screen of same size is used to express an entropic message as in claim 1 by marking a pixels as ingredient A for the bilateral entropic message, and b=pq-a pixels as ingredient B for the bilateral entropic message, and where the first and the second screens are superimposed by the use of two shades of light color: $L_1$ and $L_2$, as well as two shades of dark color, $D_1$ and $D_2$ such that a human reader of the screen will not distinguish between $L_1$ and $L_2$, and also not distinguish between $D_1$ and $D_2$, but a special sensitive camera will distinguish between $L_1$ and $L_2$, and distinguish between $D_1$ and $D_2$, the superimposition will proceed by marking every page pixel which the second screen marked as color A to be colored with shade $L_1$, and every page pixel which the second screen marked as color B to be colored with shade $L_2$, and marking every ink pixel which the second screen marked as color A to be colored with shade $D_1$, and every ink pixel which the second screen marked as color B to be colored with shade $D_2$, thereby allowing a human reader to read in the superimposed screen the message expressed in the first screen, while allowing a sensitive camera to read in the superimposed screen the message expressed in the second screen.

14. This invention describes a method as in (1) where the mixture is comprised of two ingredients A and B that are distinct chemical elements such that a certain "threshold" electromagnetic radiation, T, when projected on element A will trigger the photoelectric effect, such that a near by positive pole will attract the released electrons and an electrical current will be registered, while element B will remain bonded to its electrons and not release them when projected with radiation T, and where an apparatus that projects radiation T on the mixture will be gliding at a known speed over the mixture M, and where the apparatus will be equipped with electronic circuitry and measure at each position of M whether an electric current is registered or not, so that by mapping the locations where current was registered and where current was not registered, the apparatus will read the entropic message on M as described in (1).

What is claimed is:

1. A method to mark packages, and surfaces, with markings that are properly readable under conditions where geometry-specific markings are not very readable, as on a surface of a waving flag, a surface of a wrinkled package, or of a curved shape, or partly soiled, by using an alphabet that is not based on geometry-specific shapes of its letters, rather a "shapeless alphabet", defined through "shapeless letters" comprising:
   painting a surface with a sequence of shapeless letters L1, L2, . . . , Lt where each shapeless letter corresponds to a painted area: M1, M2, . . . , Mt
   where each painted area M is a mixture of two distinct colors A and B, such that $Q_m=Q_a+Q_b$, where $Q_m$ is the area of M, and $Q_a$ and $Q_b$ are the areas of colors A and B respectively, and where the quantitative ratio between the colors comprising the painted area is computed as $R_m=Q_a/Q_b$,
   and where the uniformity of M is measured relative to slices $S_1$, $S_2$, . . . $S_n$ marked randomly on the painted surface, M, such that their areas are all the same, $Q_s$, where $Q_s<Q_m$, and where the uniformity of the quantitative ratios between colors A and B in the n slices, $R_i=Q_{ai}/Q_{bi}$, for i=1, 2, . . . n, for an arbitrary large n, expresses the uniformity, U, of the mixture M, and where the values of R and U in combination determine the identity of the shapeless letter L, expressed by area M: L=f(U,R).

2. The method in claim 1 wherein the ratio R, and the uniformity U of M is computed via the following formula:

$$U=1-(1/(Q_s*R_n*n))\Sigma_n |R_n Q_{ai}-Q_{bi}| \ldots \text{for } i=1,2,\ldots$$

where:

$$R_n=\Sigma Q_{ai}/\Sigma Q_{bi} \ldots \text{for } i=1,2,\ldots n$$

and where R is set as $R=R_n$.

3. The method of claim 1 wherein t>2 ingredients $I_1, I_2, \ldots I_t$ are mixed into a mixture M, such that any two ingredients i and j, i, j=1, 2, . . . t define a shapeless letter $L_{ij}=f(R_{ij}, U_{ij})$, where $R_{ij}$, and $U_{ij}$ are the entropic ratios and entropic uniformities defined over ingredients $I_i$, and $I_j$, and where any set of the s ingredients, $\alpha$, may be regarded as a single ingredient A, while any set of the t ingredients, $\beta$, may be regarded as a single ingredient B, such that when sets $\alpha$ and $\beta$ are mutually exclusive, these two sets will define an entropic letter $L_{\alpha\beta}=f(R_{\alpha\beta}, U_{\alpha\beta})$, where $R_{\alpha\beta}$ and $U_{\alpha\beta}$ are the ratio and uniformity for $\alpha$, and $\beta$.

4. The method in claim 1 where a first computing device marks a shapeless letter L on a computer screen, and where the two ingredients A and B are of different colors, and where the image thereto is then captured by a digital camera feeding a second computing device which then evaluates the captured screen as the shapeless letter written by the first computing device, and where the first computing device then marks another shapeless letter L' on its computing screen, and the image thereto is then captured by the digital camera feeding the second computing device, which then evaluates the second letter L', and so on, the first computing device passes to the second computing device a message of arbitrary length by communicating one shapeless letter at a time.

5. The method in claim 1 where a pair of colors in a video stream are regarded as ingredients A and B, such that each frame of the video stream may be regarded as a mixture $M_{video}$ comprised of colors A and B and all other colors, which are neither A nor B such that every frame $F_i$ of the video stream may be interpreted as carrying an entropic letter $L_i$ defined by the ingredients A and B, resulting in the video projecting a message comprised of letters $L_1, L_2, \ldots L_r$.

6. A method as in claim 1 where a first screen S comprised of p×q pixels is set to express a shape-based letter like a letter from the Latin alphabet by coloring some g<pq pixels with a light color, to serve as the "page", the background, and coloring the other pq−g pixels with a dark color, "ink", such that the shape marked by the ink surrounded by the page, displays a visual letter, or several letters from the Latin alphabet, and where a second screen of same size is used to express an entropic message as in claim 1 by marking a pixels as ingredient A for the bilateral entropic message, and b=pq−a pixels as ingredient B for the bilateral entropic message, and where the first and the second screens are superimposed by the use of two shades of light color: $L_1$ and $L_2$, as well as two shades of dark color, $D_1$, and $D_2$ such that a human reader of the screen will not distinguish between $L_1$ and $L_2$, and also not distinguish between $D_1$ and $D_2$, but a special sensitive camera will distinguish between $L_1$ and $L_2$, and distinguish between $D_1$ and $D_2$, the superimposition will proceed by marking every page pixel which in the second screen is marked as color A to be colored with shade $L_1$, and every page pixel which the second screen marked as color B to be colored with shade $L_2$, and marking every ink pixel which the second screen marked as color A to be colored with shade $D_1$, and every ink pixel which the second screen marked as color B to be colored with shade $D_2$, thereby allowing a human reader to read in the superimposed screen as the message expressed in the first screen, while allowing a sensitive camera to read in the superimposed screen the message expressed in the second screen.

7. A method as in claim 1 where the mixture is comprised of two ingredients A and B that are distinct chemical elements such that a certain "threshold" electromagnetic radiation, T, when projected on element A will trigger the photoelectric effect, such that a near by positive pole will attract the released electrons and an electrical current will be registered, while element B will remain bonded to its electrons and not release them when projected with radiation T, and where an apparatus that projects radiation T on the mixture will be gliding at a known speed over the mixture M, and where the apparatus will be equipped with electronic circuitry and measure at each position of M whether an electric current is registered or not, so that by mapping the locations where current was registered and where current was not registered, the apparatus will read the entropic message on M as described in claim 1.

8. A system to mix two viscous incompressible chemical ingredients A and B to create a mixture, lump, M, where M expresses a shapeless letter L from a given shapeless alphabet, comprising:

an "entropic mixer", EM, that mixes ingredients A and B into a mixture stream M, which in turn is read by an "entropic reader" ER to determine the shapeless letter L written into M, an entropic controller, EC, which compares the reading of the shapeless letter, L, to a set point letter, $L_{sp}$ given to it, and then the EC adjusts operational parameters in the EM in order to generate M with the desired set point letter $L_{sp}$, the adjusted mixture stream M is again read by the ER that evaluates its shapeless letter L', and communicates the shapeless letter L' to the EC, which again adjusts the operational parameters of EM until $L_{sp}=L_m$, where $L_m$ is the shapeless letter expressed by M when the feedback control sequence is completed, wherein the identity of the shapeless letter L expressed by the lump M is determined as follows:

the lump M is a mixture of two ingredients A and B such that the ratio, R, between the volume of A, $V_a$, and the volume of b, $V_b$, in M is a ratio corresponding to L, and such that the uniformity of M, U, is of the value corresponding to L, where U is defined as follows:

(i) one randomly marks n slices on M where all the slices are of volume $V_s<V_m$, where $V_m$ is the volume of M, then (ii) one measures the n ratios between ingredients A and B in each of the n slices, and uses a certain established uniformity calculating formula to compute the uniformity U of M, from the n ratio values, for a pre-established value of n;

so manufactured the shapeless letter expressed by the lump will be readable from any surface of the lump, and from any cut thereto, and thereby identify it.

9. The system of claim 8 where the slices are cut so that one spatial dimension is very small, and thus the slices are effectively two dimensional, and also where the slices, are cut so that two spatial dimensions are very small, and the slices are effectively one dimensional.

10. The system in claim 8 where the EM is comprised of two feeding lines for ingredients A and B such that the EC controls the flow rates of A and B, and where the feed lines terminate in a first disc contraption comprised of two discs mounted perpendicular to the flow of the ingredients, fitting snugly into the flow pipe that collects the streams A and B, and where one disc is stationary, and one disc is rotating at a speed controlled by the EC, and where the stationary disc is drilled with two holes of a set size, one hole allowing ingredient A to flow through, and one hole allowing ingredient B to flow through, and where the rotating disc, rotates abreast and next to the stationary disc, and it has a single hole drilled into it, such that when this rotating hole overlaps with the hole for A in the stationary disc, ingredient A flows through, and when this rotating hole overlaps the hole for B in the stationary disc, ingredient B flows through, and where the mixture flows beyond the first disc contraption, through the pipeline until it encounters a second disc contraption comprising two snuggly fit discs which are fitted perpendicular to the flow of the mixture, and where the two discs rotate in opposite directions, and each has a hole in it, and when the two holes overlap the mixture of A and B flows through; the mixture then proceeds through the pipe and flows until it meets another disc contraption similar to the disc contraption of the second type, keeps flowing, until it meets another disc contraption of the second type, and so on, and after the last disc contraption the mixture is let outside from the EM; the holes in the various discs may be changed and controlled by the EC, so is the speed of rotation of every disc in the contraptions, such control is used to generate a mixture M associated with letter L which is the same as the desired, set point L*=L.

11. A machine readable medium having painted surface M to express a shapeless letter L, of a given shapeless alphabet, comprising:

a combination of smooth areas, A, and unsmooth areas B, where the ratio between the surface size of all the smooth areas in M, $P_a$, and the surface size of all the unsmooth areas in M, $P_b$, is the ratio value $R=P_a/P_b$, corresponding to L, and wherein the uniformity between the smooth and the unsmooth areas is the value U corresponding to L, where U is defined as follows:

(i) one randomly marks n sectors on M where all the sectors are of area $P_s<P_m$, where $P_m$ is the area of M, then (ii) one measures the n ratios between the sum of areas of A and the sum of areas of B in each of the n sectors, and uses a certain established uniformity calculating formula to compute the uniformity U of M, from the n ratio values, for a pre-established value of n;

so manufactured the surface M will express an intrinsic shapeless letter to identify it to its readers.

12. A machine readable medium as in claim 11 where a surface is evaluated via an entropic reader projecting a regular light or laser beam onto the surface at an angle γ off the perpendicular of the surface, where a smooth area on the surface reflects the beam with another beam of the same angle γ, such that the two beams mark an angle 2γ between them, while a rough area of the surface will scatter the incoming beam, and where the entropic reader will measure the amount of radiation reflected at angle 2γ, and thereby determine if the evaluated spot is smooth (ingredient A), or rough (ingredient B), the projected beam and the reflection reader are mounted on a structure that moves above the examined surface and thereby maps the entropic state of the surface with respect to A and B.

13. A machine readable as in claim 11 where established metrics of roughness and smoothness are used to mark a surface with t distinct states of roughness-smoothness, such that any two such states can define an entropic message over the surface where the smooth and rough spots are marked.

* * * * *